(12) United States Patent
Chiba et al.

(10) Patent No.: US 11,702,091 B2
(45) Date of Patent: *Jul. 18, 2023

(54) DRIVE MODE SWITCH CONTROL DEVICE AND DRIVE MODE SWITCH CONTROL METHOD

(71) Applicant: DENSO CORPORATION, Kariya (JP)

(72) Inventors: Kunihiko Chiba, Kariya (JP); Asako Nagata, Kariya (JP); Akihiko Yagyu, Kariya (JP); Takuya Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,608

(22) Filed: Jul. 18, 2022

(65) Prior Publication Data

US 2022/0348214 A1 Nov. 3, 2022

Related U.S. Application Data

(63) Continuation of application No. 16/431,824, filed on Jun. 5, 2019, now Pat. No. 11,458,982, which is a
(Continued)

(30) Foreign Application Priority Data

Dec. 7, 2016 (JP) ................................. 2016-237834

(51) Int. Cl.
*B60W 50/08* (2020.01)
*B60W 30/18* (2012.01)
(Continued)

(52) U.S. Cl.
CPC ............ *B60W 50/08* (2013.01); *B60W 30/18* (2013.01); *B60W 30/182* (2013.01);
(Continued)

(58) Field of Classification Search
None
See application file for complete search history.

(56) References Cited

U.S. PATENT DOCUMENTS 10,435,025 B2 10/2019 Ochida et al.
10,821,980 B2 11/2020 Matsunaga et al.
(Continued)

FOREIGN PATENT DOCUMENTS

| JP | 2016038846 A | 3/2016 |
| JP | 2016132352 A | 7/2016 |
| JP | 2016133984 A | 7/2016 |

OTHER PUBLICATIONS

U.S. Appl. No. 16/431,824, filed Jun. 5, 2019, Kunihiko Chiba.

*Primary Examiner* — Aniss Chad
*Assistant Examiner* — Mahmoud M Kazimi
(74) *Attorney, Agent, or Firm* — Harness, Dickey & Pierce, P.L.C.

(57) ABSTRACT

A drive mode switch control device acquires operation information. The drive mode switch control device switches a drive state among at least an autonomous drive state, a manual drive state, and a coordination drive state. The operation detection unit detects a first operation and a second operation based on the operation information when the drive state is not in the manual drive state. The second operation is the drive operation different from the first operation and input after the input of the first operation. The drive mode switch control device switches the drive state from the autonomous drive state to the coordination drive state based on a detection determination of the first operation. The drive mode switch control device switches the drive state from the coordination drive state to the manual drive state based on a detection determination of the first operation.

9 Claims, 15 Drawing Sheets

Related U.S. Application Data continuation of application No. PCT/JP2017/036570, filed on Oct. 10, 2017.

(51) Int. Cl.
| | |
|---|---|
| *B60W 30/182* | (2020.01) |
| *B60W 50/10* | (2012.01) |
| *G05D 1/00* | (2006.01) |
| *G08G 1/16* | (2006.01) |
| *B60W 50/00* | (2006.01) |
| *B60W 60/00* | (2020.01) |

(52) U.S. Cl.
CPC ........... *B60W 50/10* (2013.01); *G05D 1/0088* (2013.01); *G08G 1/16* (2013.01); *B60W 2050/0073* (2013.01); *B60W 2540/00* (2013.01); *B60W 2900/00* (2013.01)

(56) References Cited

U.S. PATENT DOCUMENTS

| | | | |
|---|---|---|---|
| 2016/0039428 A1* | 2/2016 | Odate | G05D 1/0061 701/23 |
| 2016/0207537 A1 | 7/2016 | Urano et al. | |
| 2016/0207538 A1* | 7/2016 | Urano | G05D 1/0061 |
| 2016/0362116 A1* | 12/2016 | Otsuka | B60W 50/0098 |
| 2019/0283769 A1 | 9/2019 | Chiba et al. | |
| 2019/0291747 A1 | 9/2019 | Chiba | |

\* cited by examiner

US 11,702,091 B2

DRIVE MODE SWITCH CONTROL DEVICE AND DRIVE MODE SWITCH CONTROL METHOD

CROSS REFERENCE TO RELATED APPLICATIONS

The present application is a continuation application of U.S. patent application Ser. No. 16/431,824 filed on Jun. 5, 2019, which is a continuation application of International Patent Application No. PCT/JP2017/036570 filed on Oct. 10, 2017, which designated the United States and claims the benefit of priority from Japanese Patent Application No. 2016-237834 filed on Dec. 7, 2016. The entire disclosures of all of the above applications are incorporated herein by reference.

TECHNICAL FIELD

The disclosure of this specification relates to a drive mode switch control device and a drive mode switch control method each of which controls a drive mode switch between a driver and an autonomous drive function.

BACKGROUND

In recent years, development of a vehicle provided with an autonomous drive function capable of executing a drive operation of the vehicle instead of a driver has been promoted. In such vehicles, a drive mode switch between the driver and the autonomous drive function is executed. For example, the drive mode switch from the autonomous drive function to the driver is executed when the driver performs a drive operation in a case where the vehicle is not in a manual drive mode.

SUMMARY

A drive mode switch control device may acquire operation information. The drive mode switch control device may switch a drive state among at least an autonomous drive state, a manual drive state, and a coordination drive state. The drive mode switch control device may detect a first operation and a second operation based on the operation information when the drive state is not in the manual drive state.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
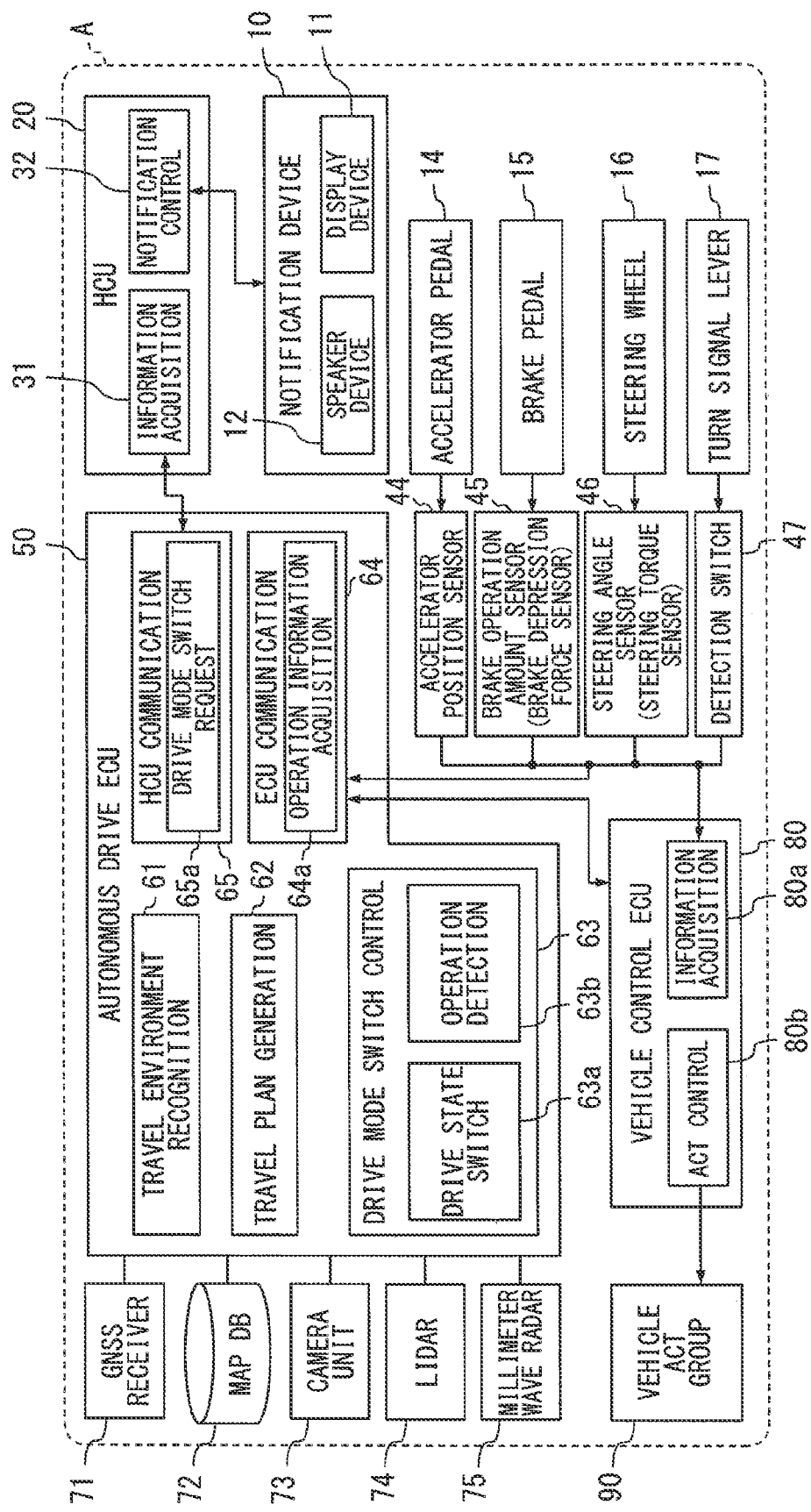
FIG. 1 is a block diagram showing an overview of a configuration related to an autonomous drive mounted on a vehicle.

For example, as a technique related to a drive mode switch, an autonomous drive vehicle system is disclosed. In the autonomous drive vehicle system includes a drive state switch unit that switches a drive state of the vehicle among an autonomous drive state, a manual drive state, and a coordination drive mode. In the autonomous drive vehicle system, in a case where the vehicle is in the autonomous drive state, the vehicle switches the drive mode to the coordination drive mode when an operation amount becomes equal to or greater than an intervention determination threshold value and a manual drive start threshold value, or a continuation count of the operation becomes equal to or greater than a first threshold value and less than a second threshold value. Furthermore, the drive state is switched from the coordination drive mode to the manual drive state when the operation amount becomes equal to or more than the manual drive start threshold value or when the operation continuation count becomes equal to or higher than the second threshold value.

The inventor of the present disclosure has pointed out that in the autonomous drive state in which the autonomous drive function controls the traveling of the vehicle, when the situation where the emergency avoidance is required occurs, the operation input by the driver in a hurry does not reflect driver's intention. Such drive operations of the driver often do not have an appropriate operation amount. Therefore, the inventor of the present disclosure considered that it is necessary to switch to the manual drive state in a state where the driver can adjust the operation amount appropriately with intention.

The vehicle drive system automatically switches the drive state to the manual drive state when the operation amount of the drive operation becomes greater than the manual drive start threshold value or the continuation count becomes greater than the second threshold value. In this configuration, the switch to the manual drive mode can be executed based on a drive operation that has continued a reflective drive operation having an excessive operation amount without recover of the intention to drive. When the drive mode switch as described above is executed, switching to the manual drive mode can be executed in a state where the driver's intention cannot be reflected in the drive operation.

An example embodiment provides a drive mode switch control device and a drive mode switch control method each of which is capable of switching to a manual drive state after a driver can reflect intention to a drive operation.

In an example embodiment, a drive mode switch control device for a vehicle is provided. The vehicle includes an autonomous drive function that performs a drive operation instead of a driver. The drive mode switch control device controls the drive mode switch between the driver and the autonomous drive function. The drive mode switch control device includes an operation information acquisition unit, a drive state switch unit, and an operation detection unit. The operation information acquisition unit acquires operation information related to the drive operation input by the driver. The drive state switch unit switches a drive state among at least an autonomous drive state, a manual drive state, and a coordination drive state. In the autonomous drive state, a travel of the vehicle is controlled by the autonomous drive function. In the manual drive state, the travel of the vehicle is controlled by the driver. In the coordination drive state, the travel of the vehicle is controlled by coordinating a control of the autonomous drive function and the drive operation of the driver. The operation detection unit detects an input of a first operation and an input of a second operation based on the operation information when the drive state is not in the manual drive state. The first operation is the drive operation of the driver. The second operation is the drive operation different from the first operation and input after the input of the first operation. The drive state switch unit switches the drive state from the autonomous drive state to the coordination drive state based on a detection determination of the first operation. The drive state switch unit switches the drive state from the coordination drive state to the manual drive state based on a detection determination of the second operation.

In another example embodiment, a drive mode switch control method for a vehicle is provided. The vehicle includes an autonomous drive function that performs a drive operation instead of a driver. The drive mode switch control method controls the drive mode switch between the driver and the autonomous drive function. The drive mode switch control method includes; acquiring operation information related to the drive operation input by the driver and detecting a first operation, which is the drive operation of the driver, based on the operation information when a drive state is not in a manual drive state, in the manual drive state, the driver controlling a travel of the vehicle; switching the drive state of the vehicle from an autonomous drive state to a coordination drive state based on a detection determination of the first operation, in the autonomous drive state, the autonomous drive function controlling the travel of the vehicle, in the coordination drive state, the travel of the vehicle being controlled by coordinating a control of the autonomous drive function and the drive operation of the driver; detecting a second operation which is the drive operation different from the first operation and input after an input of the first operation; and switching the drive state from the coordination drive state to the manual drive state based on a detection determination of the second operation.

In these configurations, when the drive state is not in the manual state, the first operation and the second operation, which is operated after the first operation, are determined. The first operation is the drive operation that is estimated to have been inputted by the driver in a hurry. The second operation is the drive operation estimated to be performed after the driver recovers the intention for driving.

With these configurations, when it is determined that the driver inputs the second operation, the drive mode is switched from the coordination drive mode to the manual drive mode. Thus, the switch to the manual drive state can be prevented when the reflexive drive operation or the continuous drive operation without recover of the intention to drive is performed. On the other hand, when the driver performs the second operation after recovering the intention to drive, the switch to the manual drive state is executed based on the input determination of the second operation. The switch to the manual drive state can be executed after the driver becomes in a state that can reflect the intention on the drive operation.

Hereinafter, a plurality of embodiments will be described with reference to the drawings. The same reference numerals are assigned to the corresponding elements in each embodiment, and thus, duplicate descriptions may be omitted. When configurations are described only partly in the respective embodiments, the configurations of the embodiments previously described may be applied to the rest of the configurations. Further, not only the combinations of the configurations explicitly shown in the description of the respective embodiments, but also the configurations of the plurality of embodiments can be partially combined even when they are not explicitly shown as long as there is no difficulty in the combination in particular. Unspecified combinations of the configurations described in the plurality of embodiments and the modification examples are also disclosed in the following description.

First Embodiment

Figure 2:
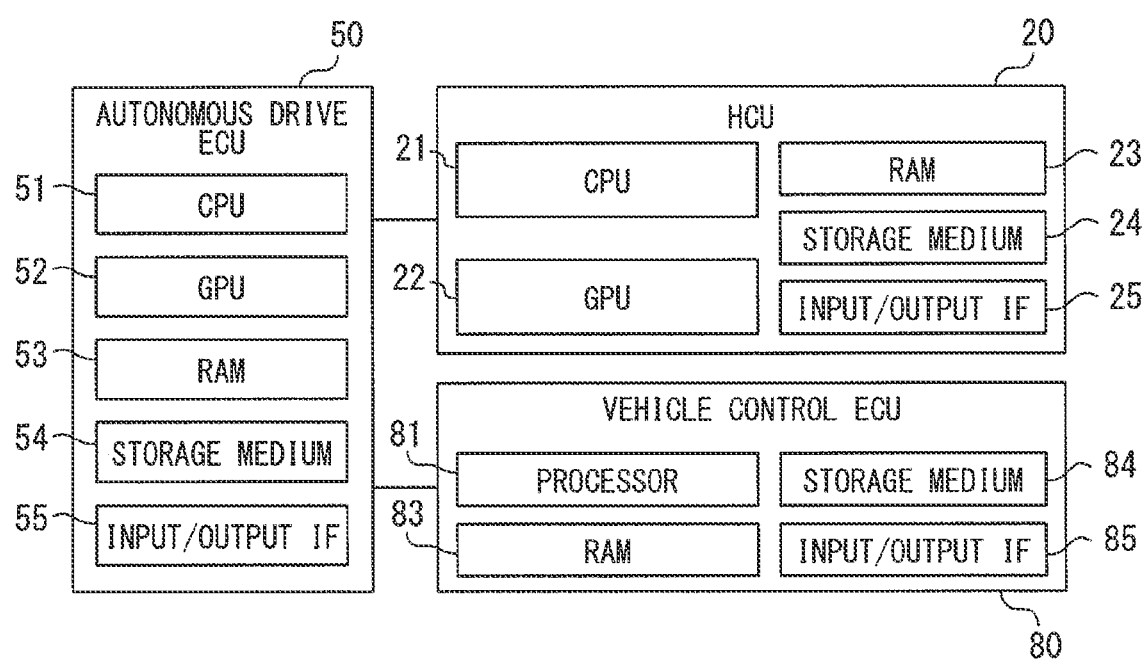
FIG. 2 is a diagram showing an example of a specific configuration of an autonomous driving ECU, an HCU, and a vehicle control ECU.

Functions of a drive mode switch control device according to a first embodiment of the present disclosure is achieved by an autonomous drive ECU (Electronic Control Unit) 50 shown in FIG. 1 and FIG. 2. The autonomous drive ECU 50 is mounted on a vehicle A together with electronic control units such as an HCU (HMI(Human Machine Interface) Control Unit) 20, a vehicle control ECU 80, and the like. The autonomous drive ECU 50, the HCU 20, and the vehicle control ECU 80 are directly or indirectly electrically connected to each other, and can communicate with each other. The vehicle A has an autonomous drive function by the operation of the autonomous drive ECU 50 and the vehicle control ECU 80.

The HCU 20 integrally controls acquisition of input information to an operation system such as a steering switch and information presentation to the driver. The HCU 20 mainly includes a computer having a main processor 21, a graphic processor 22, a RAM 23, a storage medium 24, and an input/output interface 25. The HCU 20 is electrically connected to a plurality of notification devices 10 for notifying the driver of the information.

The notification device 10 notifies various kinds of information related to the vehicle A to the occupants of the vehicle A including the driver based on a notification control signal output by the HCU 20. The notification device 10 may be preliminary mounted on the vehicle A, or may be temporarily mounted on the vehicle A by being brought into the vehicle compartment by the occupant of the vehicle A.

The notification device 10 includes, for example, a display device 11 that notifies the information by display, a speaker device 12 that notifies the information by a notification sound, a message voice, or the like.

The HCU 20 has an information acquisition unit 31 and a notification control unit 32 as functional blocks by causing the processors 21 and 22 to execute the notification control program stored in the storage medium 24. The information acquisition unit 31 acquires various kinds of information from the autonomous drive ECU 50 and the vehicle control ECU 80. The information acquisition unit 31 acquires, for example, switch request information for requesting the drive mode switch from the autonomous drive function to the driver.

The notification control unit 32 generates the notification control signal to be output to the display device 11 and the speaker device 12 based on the information acquired by the information acquisition unit 31. The notification control unit 32 controls the information presentation by display and sound by outputting the notification control signal to the display device 11 and the speaker device 12. The notification control unit 32 notifies the driver of taking over the drive operation from the autonomous drive function using the display device 11 and the speaker device 12 when the switch request information is acquired by the information acquiring unit 31.

The vehicle control ECU 80 is directly or indirectly electrically connected to a vehicle actuator group 90 mounted on the vehicle A. In addition, the vehicle control ECU 80 is electrically connected directly or indirectly to a sensor group that detects the drive operation performed by the driver. The vehicle actuator group 90 includes, for example, a throttle actuator of an electronic control throttle, an injector, a brake actuator, drive and regenerative motor generators, a steering actuator, or the like.

The sensor group includes an accelerator position sensor 44, a brake operation amount sensor 45, a steering angle sensor 46, a detection switch 47, or the like. The accelerator position sensor 44 detects stroke amount of the accelerator pedal 14. The brake operation amount sensor 45 is provided by a brake depression force sensor that detects the depression force input to the brake pedal 15.

The steering angle sensor 46 detects the rotation angle of the steering wheel 16. A steering torque sensor that detects a steering torque input to the steering wheel 16 may be provided instead of the steering angle sensor 46 or together with the steering angle sensor 46. The detection switch 47 detects an operation input to a turn signal lever 17. Each sensor and the switch 47 output the operation information for detecting the drive operation to the autonomous drive ECU 50 and the vehicle control ECU 80. The accelerator pedal 14, the brake pedal 15, the steering wheel 16, and the turn signal lever 17 described above correspond to the operation target of the drive operation.

The vehicle control ECU 80 mainly includes a computer having a processor 81, a RAM 83, a storage medium 84, an input/output interface 85, and the like. The processor 81 executes the vehicle control program stored in the storage medium 84 so that the vehicle control ECU 80 constructs a drive information acquisition unit 80*a* and an actuator control unit 80*b* as functional blocks.

The drive information acquisition unit 80*a* is capable of acquiring, as information used for behavior control of the vehicle A, drive state information (described later) in addition to the vehicle control information output from the autonomous drive ECU 50 and the operation information output from the sensor group. The drive state information indicates the operation state of the autonomous drive. The actuator control unit 80*b* generates the control signal output from the vehicle control ECU 80 to the vehicle actuator group 90 based on at least a piece of the vehicle control information and the operation information acquired by the drive information acquisition unit 80*a*.

The autonomous drive ECU 50 is electrically connected directly or indirectly to a GNSS receiver 71, a map database 72, a camera unit 73, a lidar 74, a millimeter wave radar 75 and the like. The autonomous drive ECU 50 acquires information related to the travel environment around the subject vehicle necessary for the autonomous drive from these devices (71 to 75).

The GNSS (Global Navigation Satellite System) receiver 71 receives positioning signals from a plurality of artificial satellites. The GNSS receiver 71 measures the present position of the vehicle A based on the received positioning signals. The GNSS receiver 71 sequentially outputs the measured position information of the vehicle A to the autonomous drive ECU 50.

The map database 72 is a storage medium storing a large amount of map data. The map data includes structural information such as the curvature of each road, the gradient, and the length of each section, and non-temporary traffic regulation information such as speed limit and one-way traffic. The map database 72 causes the autonomous drive ECU 50 to acquire the map data around the present position of the vehicle A and in the travel direction.

Each of the camera unit 73, the lidar 74, and the millimeter wave radar 75 is provided by an autonomous sensor that detects moving object such as a pedestrian and another vehicle around the vehicle A, and stationary object such as a fallen object on the road, a traffic signal, a guardrail, a curbstone, a road sign, a road marking, and a lane marker. The camera unit 73, the lidar 74, and the millimeter wave radar 75 sequentially output the detected object information related to the detected moving object and stationary object to the autonomous drive ECU 50.

The camera unit 73 includes a monocular or compound eye front camera that photographs a front area of the vehicle A, and an image processing unit that analyzes an image of the front area photographed by the front camera. The camera unit 73 acquires detected object information by extracting the moving object and the stationary object in the image of the front area.

The lidar 74 emits laser light toward the travel direction of the vehicle A, and acquires detected object information by receiving the laser light reflected by the moving object, the stationary object, or the like existing in the travel direction. The millimeter wave radar 75 emits a millimeter wave toward the travel direction of the vehicle A, and acquires detected object information by receiving the millimeter wave reflected by the moving object, the stationary object, or the like existing in the travel direction. The millimeter wave radar 75 can detect an object located farther than the lidar 74 can detect.

The autonomous drive ECU 50 executes the acceleration/deceleration control and the steering control of the vehicle A in cooperation with the vehicle control ECU 80 so as to exhibit the autonomous drive function capable of executing the drive operation of the vehicle A instead of the driver. The autonomous drive ECU 50 mainly includes a computer having a main processor 51, a graphic processor 52, a RAM 53, a storage medium 54, and an input/output interface 55. The autonomous drive ECU 50 can execute the autonomous drive program, the drive mode switch program, and the like stored in the storage medium 54 using the processors 51 and

52. The autonomous drive ECU 50 has a travel environment recognition unit 61, a travel plan generation unit 62, a drive mode switch control unit 63, an ECU communication unit 64, and an HCU communication unit 65 as functional blocks related to the autonomous drive based on the autonomous drive program and the drive mode switch program.

The travel environment recognition unit 61 recognizes the travel environment of the vehicle A by combining the position information acquired from the GNSS receiver 71, the map data acquired from the map database 72, the detected object information acquired from each autonomous sensor, and the like. The travel environment recognition unit 61 recognizes the shape and movement state of the object around the vehicle A, particularly within the detection range of each autonomous sensor, based on the integration result of the detected object information and combines the shape and movement state of the object with the position information and the map data. With this configuration, the travel environment recognition unit 61 generates a virtual space that reproduces the actual travel environment in three dimensions.

The travel plan generation unit 62 generates a travel plan for autonomous travel of the vehicle A by the autonomous drive function based on the travel environment recognized by the travel environment recognition unit 61. As a travel plan, a long and medium term travel plan and a short term travel plan are generated. In the long and medium term travel plan, a route for directing the vehicle A to the destination set by the driver is defined. The schedule of planned drive mode switch from the autonomous drive function to the driver is mainly set based on the long and medium term travel plan. In the short term travel plan, a planned travel route for realizing a travel according to the long and medium term travel plan is defined by using the virtual space around the vehicle A generated by the travel environment recognition unit 61. Specifically, a steering for lane keeping and lane change, acceleration/deceleration for speed adjustment, sudden braking for collision avoidance, and the like are determined and executed based on the short term travel plan.

The drive mode switch control unit 63 controls the switch of the control right related to the drive operation between the autonomous drive function and the driver. The drive mode switch control unit 63 starts the operation of the autonomous drive function by detecting the switch operation to the autonomous drive by the driver in the area where the autonomous drive can be executed. The drive mode switch control unit 63 switches from the autonomous drive to the manual drive of the driver as planned before the end of the area capable of autonomous drive ends by the reference to the long and middle term travel plan. Even when the travel environment recognition unit 61 accidentally or suddenly has difficulty in recognizing the travel environment, so that the travel plan generation unit 62 has difficulty in generating the short term travel plan, the drive mode switch control unit 63 is capable of switching from the autonomous drive to the manual drive.

The ECU communication unit 64 executes an output processing of the information to the vehicle control ECU 80 and an acquisition processing of the information from the vehicle control ECU 80. Specifically, the ECU communication unit 64 generates the vehicle control information for instructing acceleration/deceleration and steering according to the planned travel route defined by the travel plan generation unit 62, and sequentially outputs the vehicle control information together with the drive state information (described later) indicating the operation state of the autonomous drive to the vehicle control ECU 80. The ECU communication unit 64 is capable of correcting the content of the vehicle control information by sequentially acquiring the state information indicating the control state of the vehicle actuator group 90 from the vehicle control ECU 80.

In addition, the ECU communication unit 64 has an operation information acquisition block 64a as a sub functional block. The operation information acquisition block 64a acquires signals output from the accelerator position sensor 44, the brake operation amount sensor 45, the steering angle sensor 46, and the detection switch 47 as the operation information related to the drive operation input by the driver. The operation information is provided to the drive mode switch control unit 63, and is used at the time of the drive mode switch from the autonomous drive function to the driver.

The HCU communication unit 65 executes an output processing of the information to the HCU 20 and an acquisition processing of the information from the HCU 20. The HCU communication unit 65 has a drive mode switch request block 65a as a sub functional block. The drive mode switch request block 65a generates the switch request information for requesting the drive mode to switch from the autonomous drive function to the driver based on the drive mode switch schedule generated by the drive mode switch control unit 63, and outputs the switch request information to the HCU 20. The drive mode switch request block 65a requests the driver to switch the drive mode by controlling the notification device 10 in cooperation with the HCU 20.

Next, the details of the drive mode switch control by the drive mode switch control unit 63 described above will be further described. The drive mode switch control unit 63 includes a drive state switch block 63a and an operation detection block 63b as sub functional blocks that control switching from the autonomous drive to the manual drive. First, the functions of these sub functional blocks will be described based on FIG. 1 and FIG. 3.

The drive state switch block 63a switches the drive mode of the vehicle A among a plurality of predetermined drive modes (see FIG. 3) by the control of transitioning the operation state of the autonomous drive function. The plurality of predetermined drive modes switched by the drive state switch block 63a includes at least a coordination drive mode and an autonomous drive retraction mode in addition to the manual drive mode and the normal autonomous drive mode. The drive mode currently set by the drive state switch block 63a is notified to the information acquisition unit 31 of the HCU 20 and the drive information acquisition unit 80a of the vehicle control ECU 80 as drive state information.

In the manual drive mode, the autonomous drive function is stopped, and the driver controls the travel of the vehicle A. The vehicle control ECU 80 that acquires the drive state information indicative of being in the manual drive mode causes the actuator control unit 80b to generate the control signal according to the operation information acquired from each of the sensors 44 to 46, and transmits the control signal to the vehicle actuator group 90.

In the autonomous drive mode, the autonomous drive function controls the travel of the vehicle A. The vehicle control ECU 80 that acquires the drive state information indicative of being in the autonomous drive mode causes the actuator control unit 80b to generate the control signal according to the vehicle control information acquired from the autonomous drive ECU 50, and transmits the control signal to the vehicle actuator group 90.

The coordination drive mode is a specific one of the autonomous drive mode. Thus, in the coordination drive mode, the autonomous drive function is operating. In the coordination drive mode, the travel of the vehicle A is controlled by coordinating the control by the autonomous drive function and the drive operation by the driver. The vehicle control ECU 80 that acquires the drive state information indicative of being in the coordination drive mode generates the control signal based on the operation information acquired from each of the sensors 44 to 46 and the vehicle control information acquired from the autonomous drive ECU 50, and outputs the control signal to the vehicle actuator group 90.

Specifically, when the drive force indicated by the drive state information and the drive force indicated by the operation information are different from each other, the actuator control unit 80*b* generates the control signal based on the larger drive force of the two drive forces. Similarly, when the braking force indicated by the drive state information and the braking force indicated by the operation information are different from each other, the actuator control unit 80*b* generates the control signal based on the larger braking force of the two braking forces. In addition, when the steering target value indicated by the drive state information and the actual steering angle indicated by the operation information are different from each other, the actuator control unit 80*b* outputs the control signal that causes the torque of the steering actuator to increase or decrease so that the steering target value indicated by the drive state information approaches the actual steering angle.

The autonomous retraction mode is another one of the autonomous drive mode. Thus, in the cooperative drive mode, the autonomous drive function is operating. The autonomous retraction mode is executed when the transfer of control right from the autonomous drive function to the driver is not desired. The vehicle A in the autonomous retraction mode automatically travels to the stop position searched by the autonomous drive ECU 50, and stops at the stop position. The vehicle control ECU 80 that acquires the drive state information indicative of being in the autonomous retraction mode basically ignores the operation information acquired from each of the sensors 44 to 46, and outputs the control signal based on the vehicle control information acquired from the autonomous drive ECU 50.

In the vehicle A on which the autonomous drive function is operating, the operation detection block 63*b* detects the drive operation of the driver related to a handover and an override of the control right based on the operation information acquired by the operation information acquisition block 64*a*. The handover represents one of the drive mode switches in which the control right is transferred to the driver. In the handover, when the autonomous drive ECU 50 determines that the autonomous drive cannot continue, the autonomous drive ECU 50 requests the driver to switch the driving and the driver performs the drive operation in response to the request. On the other hand, the override represents one of the drive mode switches in which the control right is transferred to the driver. In the override, while the vehicle A is travel by the autonomous drive function, the driver performs the drive operation by own intention. The handover is the transfer from the autonomous drive function to the driver based on the determination of the system. The override is the transfer from the autonomous drive function to the driver based on the determination of the driver.

When the drive mode is not in the manual mode, that is, when the drive mode is in the autonomous drive mode or in the coordination drive mode in which the autonomous drive function is capable of intervening in the drive operation, the operation detection block 63*b* detects a first operation or a second operation which is the drive operation by the driver. The operation detection block 63*b* stores, for each operation target, an operation amount threshold value and a time threshold value that respectively define the operation amount and the operation continuation time for performing the presence determination of the first operation or the second operation. The operation detection block 63*b* detects, as the first operation or the second operation, the drive operation that exceeds both the operation amount threshold value and the time threshold value based on the operation information.

The operation detection block 63*b* detects, as the first operation, the drive operation that is reflexively performed by the driver in response to an event that may interfere with the travel of the vehicle A. The first operation is a drive operation that is estimated to have been inputted by the driver in a hurry. On the other hand, a drive operation performed after the first operation and different from the first operation is detected as the second operation. The second operation is a drive operation estimated to be performed after the driver recovers the intention for driving.

Specifically, it is considered that it takes approximately 2.5 seconds for the driver to recover the intention to drive from the occurrence of the event. On the other hand, it is considered that the reflexive drive operation is performed within approximately 2.0 seconds from the occurrence of the event. Therefore, in the operation detection block 63*b*, a value of approximately 0.5 seconds is set as a time for recovery of the driver's intention (intention recovery time). The operation detection block 63*b* detects, as the second operation, the drive operation performed in approximately 0.5 seconds after the detection determination of the first operation.

The operation targets to which the first operation and the second operation are input may be the same or different. As an example, the operation detection block 63*b* may detect a drive operation of stepping on the brake pedal 15 as the first operation and may detect a drive operation of steering the steering wheel 16 as the second operation. As described above, the operation detection block 63*b* is capable of detecting, as the second operation, a drive operation on an operation target other than the operation target to which the first operation has been input.

As another example, the operation detection block 63*b* may detect a drive operation of strongly depressing on the brake pedal 15 as the first operation and may detect a drive operation in which the depression force of the brake pedal 15 is adjusted as the second operation. As described above, the operation detection block 63*b* is capable of detecting the drive operation, as the second operation, which is input to the operation target to which the first operation is input and the operation amount of which is smaller than the operation amount of the first operation.

Figure 3:
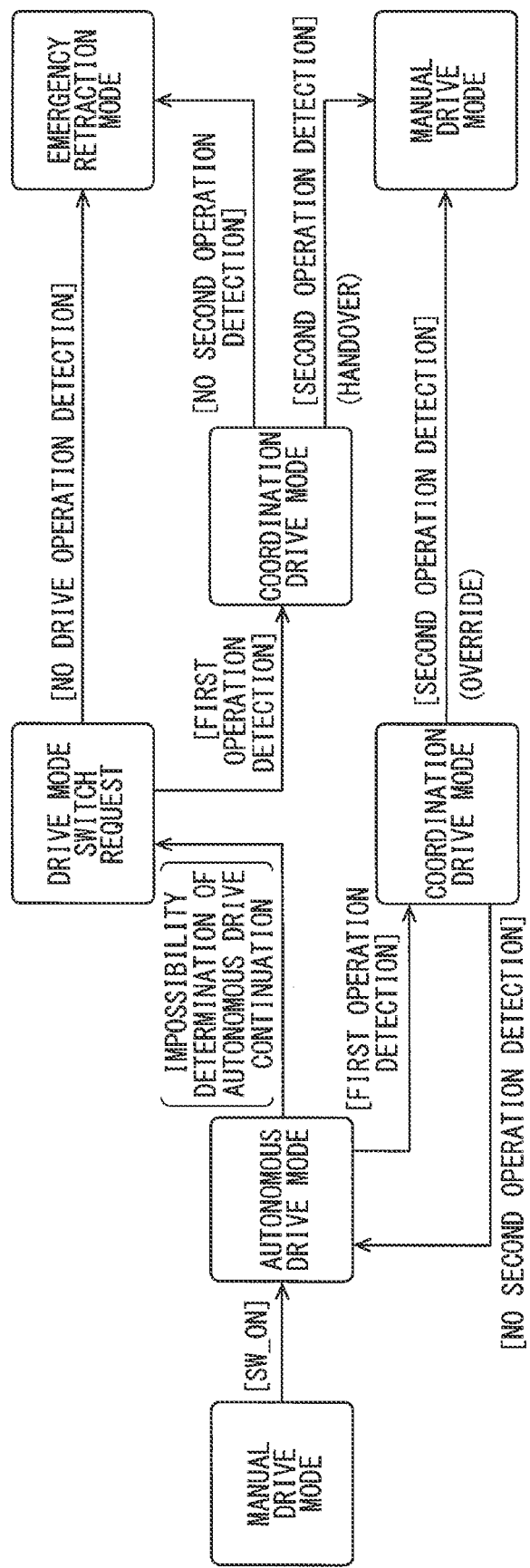
FIG. 3 is a state transition diagram showing an overview of a drive mode transition executed by a drive mode switch control unit.
Figure 4:
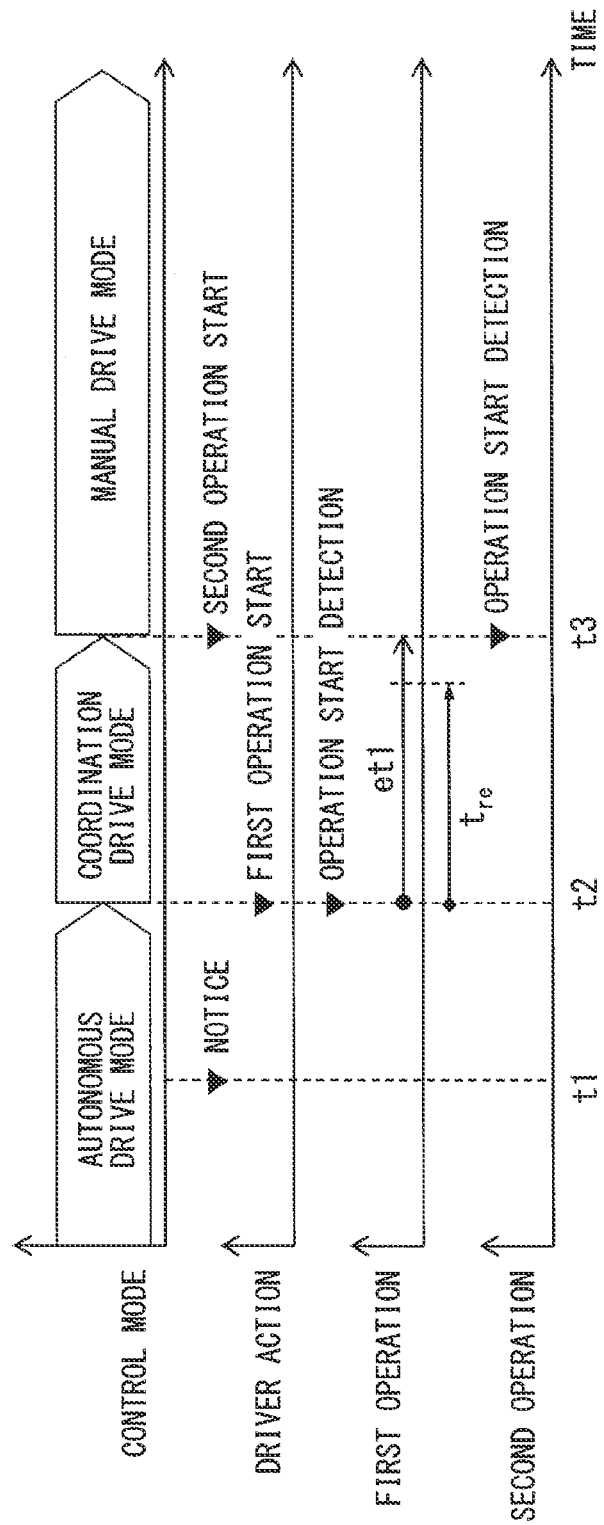
FIG. 4 is a time chart showing a transition when a drive mode switch is executed by an override.
Figure 5:
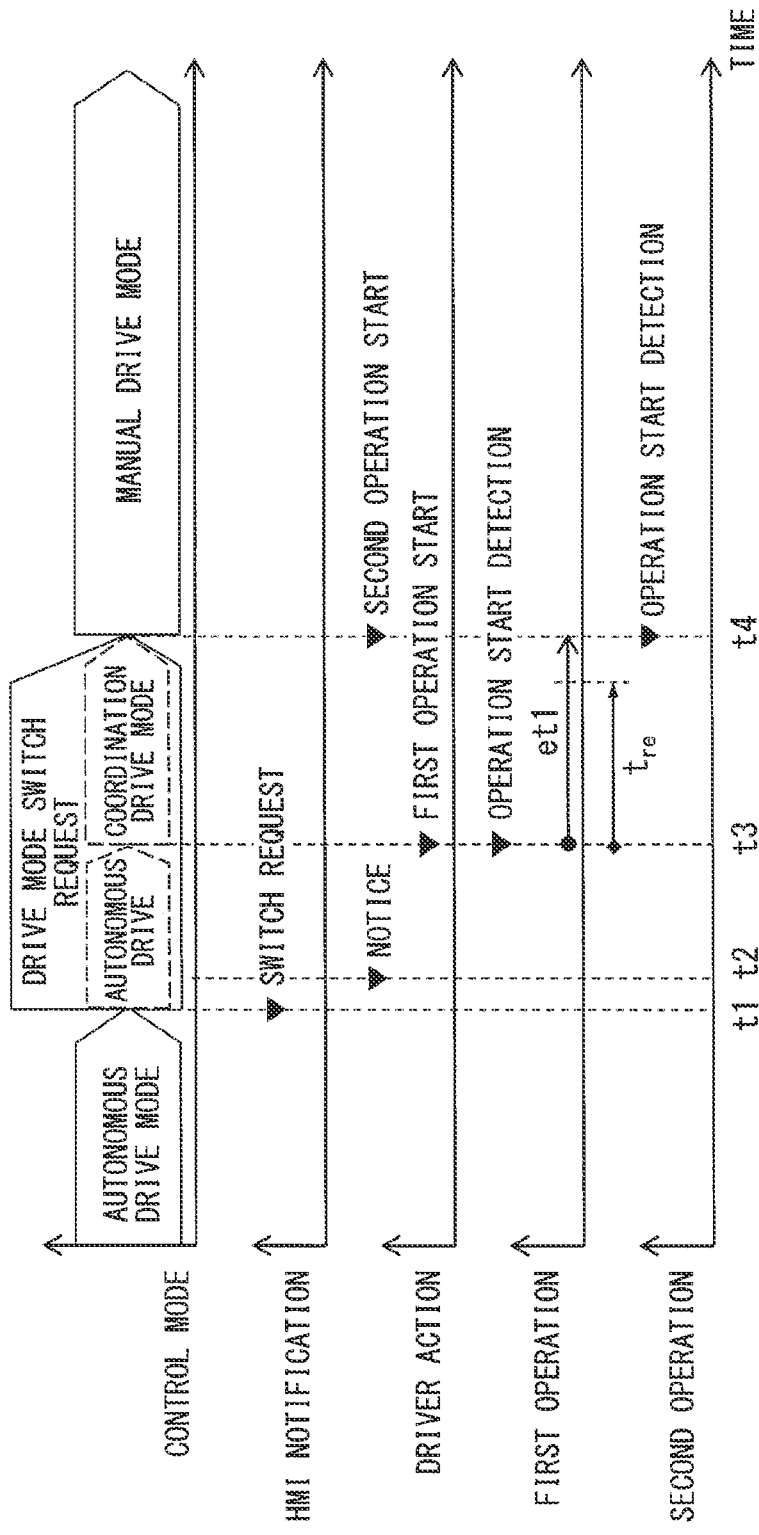
FIG. 5 is a time chart showing a transition when the drive mode switch is executed by a handover.

Next, the correlation of the transition of the drive mode by the drive state switch block 63*a* will be further described based on FIGS. 3 to 5, with reference to FIG. 1.

The drive state switch block 63*a* switches the drive mode from the manual drive mode to the normal autonomous drive mode in response to an input of a switch for instructing the start of autonomous drive provided in an operation system such as the steering switch. As shown in FIG. 3 and FIG. 4, in the autonomous drive mode, for example, when the driver notices a falling object or the like in front to be avoided (time point t1), the drive operation that exceeds the operation amount threshold value and the time threshold value is input by the driver (time point t2). Based on the detection of the first operation, the drive state switch block 63*a* switches the drive mode from the autonomous drive mode to the coordination drive mode.

In the coordination drive mode, when the driver input an additional drive operation after the first operation continues beyond the reference value, the drive operation is detected by the operation detection block 63*b* (time point t3). Based on the detection of the second operation, the drive state switch block 63*a* switches the drive mode from the coordination drive mode to the manual drive mode. In the first embodiment, when the second operation detection is determined, the switching of the drive state from the coordination drive mode to the manual drive mode is immediately started. As described above, the override by the driver is completed.

There may be no request for drive mode switch shown in FIG. 3 and a predetermined restart standby period (for example, approximately 3 seconds) may have passed without detecting the second operation after the switching to the coordination drive based on the detection determination of the first operation. In this time, the drive state switch block 63*a* switches the drive mode from the coordination drive mode to the autonomous drive mode. With the above-described control, the vehicle A resumes the travel by the autonomous drive function even without the driver's special operation. With the transition of the drive mode, when being in the autonomous drive and trying to overtake a large vehicle travel in an adjacent lane, the vehicle A is capable of temporarily moving farther from the large vehicle in the lane by the steering operation without canceling the autonomous drive.

As shown in FIGS. 3 and 5, in the autonomous drive mode, when it is determined that the continuation of the autonomous drive is impossible, the autonomous drive transitions to the mode that executes a drive mode switch request (time point t1). When the driver notices such a drive mode switch request (time point t2), a drive operation that exceeds the operation amount threshold value and the time threshold value is input. Based on the detection of the first operation, the drive state switch block 63*a* switches to the coordination drive mode (time point t3).

In the coordination drive mode, when the driver input the additional drive operation after the first operation continues beyond the reference value, the drive operation is detected (time point t4). Based on the detection of the second operation, the drive state switch block 63*a* stops the drive mode switch request and switches from the coordination drive mode to the manual drive mode. The switch of the drive state from the coordination drive mode to the manual drive mode is triggered by the determination that the second operation is detected, and immediately starts without a waiting time. As described above, the handover by the driver is completed.

As shown in FIG. 3, when a predetermined request execution time preliminary has elapsed without the detection of the second operation after the transition to the coordination drive mode in response to the drive mode switch request, the drive state switch block 63*a* switches from the coordination drive mode to the autonomous retraction mode. Similarly, when the predetermined request execution time has elapsed without the detection of any drive operation after the execution of the drive mode switch request, the drive state switch block 63*a* switches to the autonomous retraction mode. With this configuration, the vehicle A sequentially starts the search for the stop position and the travel to the stop position by the coordination control of the autonomous drive ECU 50 and the vehicle control ECU 80. The above-described control effectively functions when the driver has difficulty in driving. The request execution time is set so that the vehicle A does not go out of the autonomous drive area without switching to the manual drive mode. For example, the request execution time is set to approximately 4 seconds.

The details of the drive mode switch control processing executed by the autonomous drive ECU 50 in order to realize the above-described override and handover will be described based on FIGS. 6 and 7, with reference to FIG. 1. The drive mode switch control processing shown in FIGS. 6 and 7 is started by the drive mode switch control unit 63 based on the switching from the manual drive mode to the autonomous drive mode.

Figure 6:
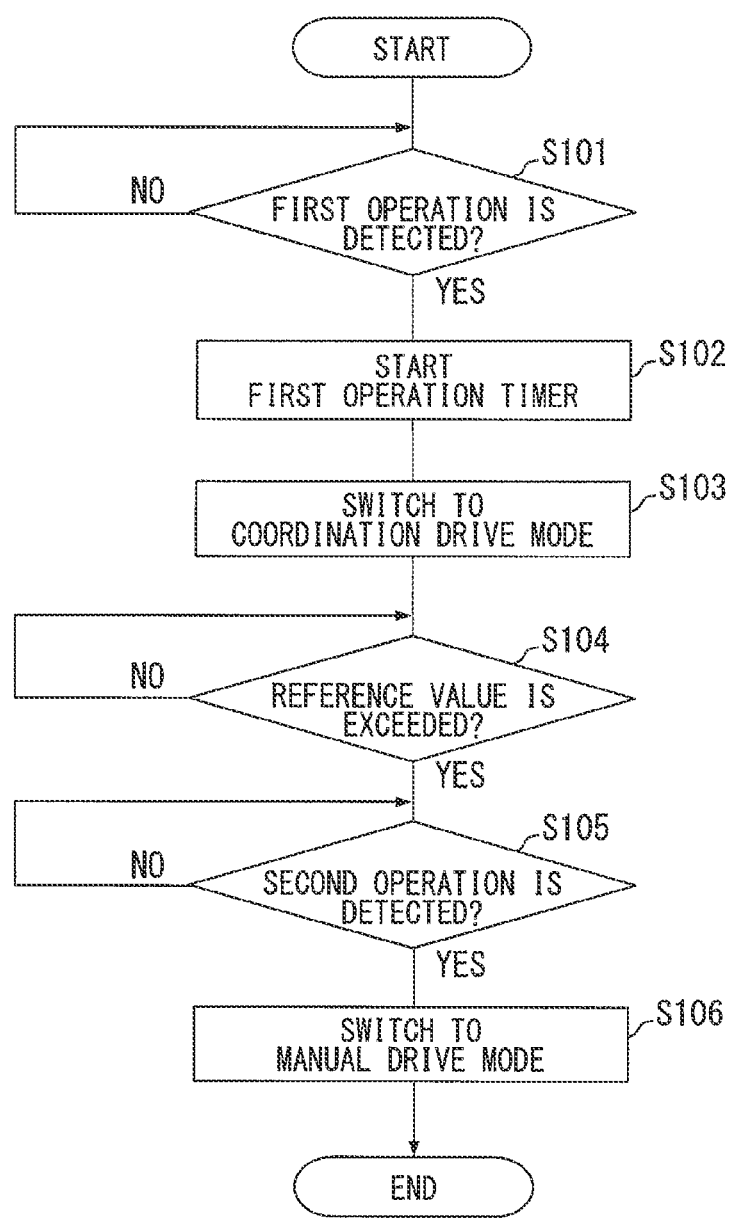
FIG. 6 is a flowchart showing details of a drive mode switch control processing for realizing the drive mode switch by the override.
Figure 7:
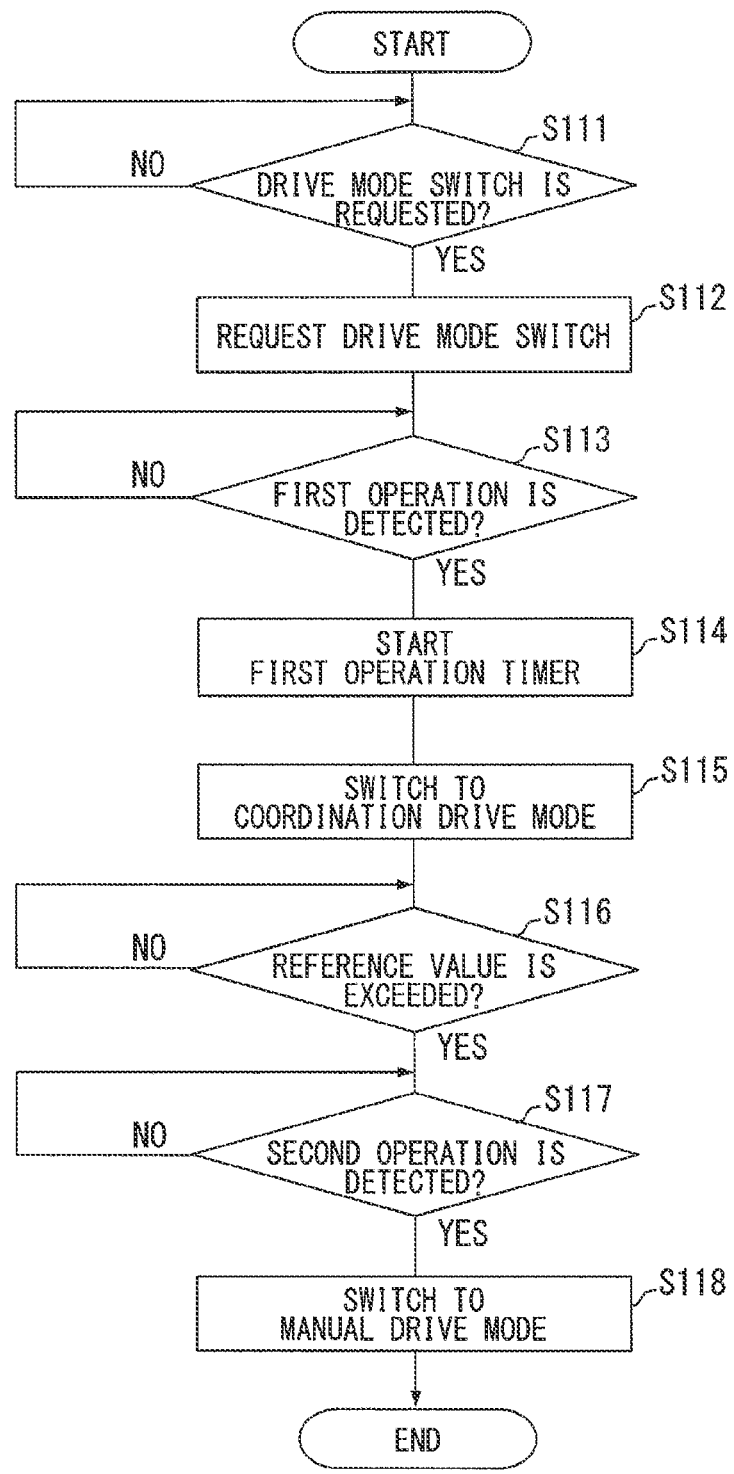
FIG. 7 is a flowchart showing details of a drive mode switch control processing for realizing the drive mode switch by the handover.

According to the drive mode switch control processing shown in FIG. 6, the above-described handover is realized. At S101, the drive switch control unit 63 acquires the operation information related to the drive operation input by the driver, and detects the first operation based on the acquired operation information. When the drive switch control unit 63 detects the first operation at S101, the processing proceeds to S102. On the other hand, when the drive switch control unit 63 cannot detect the first operation at S101, the drive switch control unit 63 continues the detection determination at S101. When the vehicle A is not in the manual operation mode, the drive switch control unit 63 continuously performs the detection determination at S101.

At S102, the drive switch control unit 63 starts counting of a timer, which measures the continuation period of the first operation, in order to measure an elapsed time et1 from the time point t2 (see FIG. 4) at which the first operation is detected, and the processing proceeds to S103. At S103, the drive switch control unit 63 switches the drive mode of the vehicle A from the autonomous drive mode to the coordination drive mode (see time point t2 in FIG. 4) based on the detection determination of the first operation at S101, and the processing proceeds to S104 (see time point t2 in FIG. 4).

At S104, the drive switch control unit 63 determines whether the elapsed time et1 of the timer at which the drive switch control unit 63 starts counting at S102 exceeds the reference value. As the reference value, 0.5 seconds which is the above-described intention recovery time is applied as an example. At S104, the drive switch control unit 63 repeats the determination whether the elapsed time et1 exceeds the reference value. When the elapsed time et1 exceeds the reference value, the processing proceeds to S105.

At S105, the drive switch control unit 63 detects the second operation of the drive based on the operation information. When the drive switch control unit 63 detects the second operation at S105, the processing proceeds to S106. On the other hand, when the drive switch control unit 63 cannot detect the second operation, the drive switch control unit 63 continues the detection determination at S105. At S106, the drive mode switch control unit 63 switches the drive mode of the vehicle A from the coordination drive mode to the manual drive mode (see time point t3 in FIG. 4) based on the detection determination of the second operation at S105, and the drive switch control processing is terminated.

According to the drive mode switch control processing shown in FIG. 7, the above-described override is realized. At S111, the drive mode switch control unit 63 determines whether the time point for requesting the drive mode switch to the driver comes based on the long and medium term travel plan. The determination at S111 is repeated until the time point for requesting the drive mode switch comes.

When the drive mode switch control unit 63 determines that the time point for requesting the drive mode switch comes at S111, the processing proceeds to S112. At S112, the drive mode switch control unit 63 starts requesting the drive mode switch (see time point t1 in FIG. 5), the processing proceeds to S113.

At S113, the drive switch control unit 63 executes the detection determination of the first operation similarly to S101 (see FIG. 6). In response to the detection of the first operation, the processing proceeds to S114. At S114, the drive switch control unit 63 starts counting of the timer in order to measure the elapsed time et1 from the time point t3 (see FIG. 5) at which the first operation is detected, and the processing proceeds to S115. At S115, the drive switch control unit 63 switches the drive mode of the vehicle A from the autonomous drive mode to the coordination drive mode (see time point t3 in FIG. 5) based on the detection determination of the first operation at S114, and the processing proceeds to S116.

At S116, the drive switch control unit 63 determines whether the elapsed time et1 of the timer exceeds the reference value (for example, 0.5 seconds) similarly to S104 (see FIG. 6). In response that the elapsed time et1 exceeds the reference value, the processing proceeds to S117. At S117, the drive switch control unit 63 executes the detection determination of the second operation similarly to S105 (see FIG. 6). In response to the detection of the second operation, the processing proceeds to S118. At S118, the drive mode switch control unit 63 switches the drive mode of the vehicle A from the coordination drive mode to the manual drive mode (see time point t4 in FIG. 5) based on the detection determination of the second operation at S117, and the drive mode switch control processing is terminated.

In the first embodiment described above, not when the input of the first operation is determined but when the input of the second operation after the detection of the first operation is determined, the coordination drive mode is switched to the manual drive mode. With this configuration, the switch to the manual drive mode can be prevented when the reflexive drive operation or the continuous drive operation without recover of the intention to drive is performed. On the other hand, when the driver performs the second operation after recovering the intention to drive, the switch to the manual drive mode is executed based on the input determination of the second operation. Therefore, the autonomous drive ECU 50 can switch to the manual drive mode after the driver becomes in a state that can reflect the intention on the drive operation.

In addition, in the first embodiment, the switch of the drive state from the coordination drive mode to the manual drive mode is started at substantially the same time point as the detection of the second operation based on the detection determination of the second operation. With the set of such switch start time point, the autonomous drive ECU 50 can quickly return the control of the drive operation to the driver who recovers the intention to drive.

The operation detection block 63b of the first embodiment can detect the drive operation, as the second operation, which is input to the same operation target having been input in the first operation and the operation amount of which is smaller than the operation amount of the first operation. In general, the driver notices that the operation amount of the drive operation (first operation) input in response to the event that has occurred is excessive, and performs the drive operation for adjusting the operation amount to be smaller. The driver who performs the drive operation to adjust such an operation amount is recovered to the state in which the intention can be reflected in the drive operation. Therefore, when the drive operation that reduces the operation amount is detected as the second operation, the control right of the drive operation can be reliably passed to the driver in the state in which the intention can be reflected in the drive operation.

The operation detection block 63b of the first embodiment can detect, as the second operation, the drive operation to the operation target other than the operation target to which the first operation has been input. When performing the drive operations to the plurality of the operation targets, the driver is highly likely to have already recovered the intention to the drive operations. Therefore, when the drive operation that is different from the drive operation in the first operation is detected as the second operation, the drive mode switch control unit 63 can reliably pass the control right of the drive operation to the driver who can reflect the intention of the drive operation.

The operation detection block 63b of the first embodiment detects, as the second operation, the drive operation performed after the intention recovery time has elapsed since the first operation of the detection determination is executed. As described above, with the difference between the detection time points of the first operation and the second operation, the unintended operation input of the reflexive first operation can be avoided to be detected as the second operation. Then, the certainty that only the intended drive operation is detected as the second operation is improved.

In the first embodiment, when no intentional drive operation is input after the drive mode switch is requested, the drive mode is not switched to the manual drive mode but to the autonomous retraction mode. With the control described above, the drive mode switch to the driver who has not recovered the intention to the drive operation can be reliably avoided.

When the drive mode switch request is not performed, the autonomous drive ECU 50 can continue the autonomous drive. There may be no request for drive mode switch. In this case, when the second operation is not detected after the switch to the coordination drive mode, the drive mode may be returned to the autonomous drive mode. The control described above can prevents the control right from being passed to the driver who has no intention of the drive operation.

In the first embodiment, the autonomous drive ECU 50 corresponds to a "drive mode switch control device". The main processor 51 and the graphic processor 52 correspond to a "processing unit". The drive state switch block 63a corresponds to a "drive state switch unit". The operation detection block 63b corresponds to an "operation detection unit". The operation information acquisition block 64a corresponds to an "operation information acquisition unit". The drive mode switch request block 65a corresponds to an "drive mode switch request unit". The autonomous drive mode corresponds to an "autonomous drive state". The manual operation mode corresponds to a "manual operation state". The coordination drive mode corresponds to a "coordination drive state". The autonomous retraction mode corresponds to an "autonomous evacuation state".

Second Embodiment

A second embodiment of the present disclosure shown in FIGS. 8 to 11 is a modification of the first embodiment. The second operation may continue beyond a predetermined switch standby time tde after the detection determination of the second operation is executed. In this case, the drive state switch block 63a (see FIG. 1) according to the second embodiment starts switching the drive mode from the coordination drive mode to the manual drive mode. The switch standby time tde may be set to substantially the same time as the intention recovery time tre, for example, set to approximately 0.5 seconds.

Figure 8:
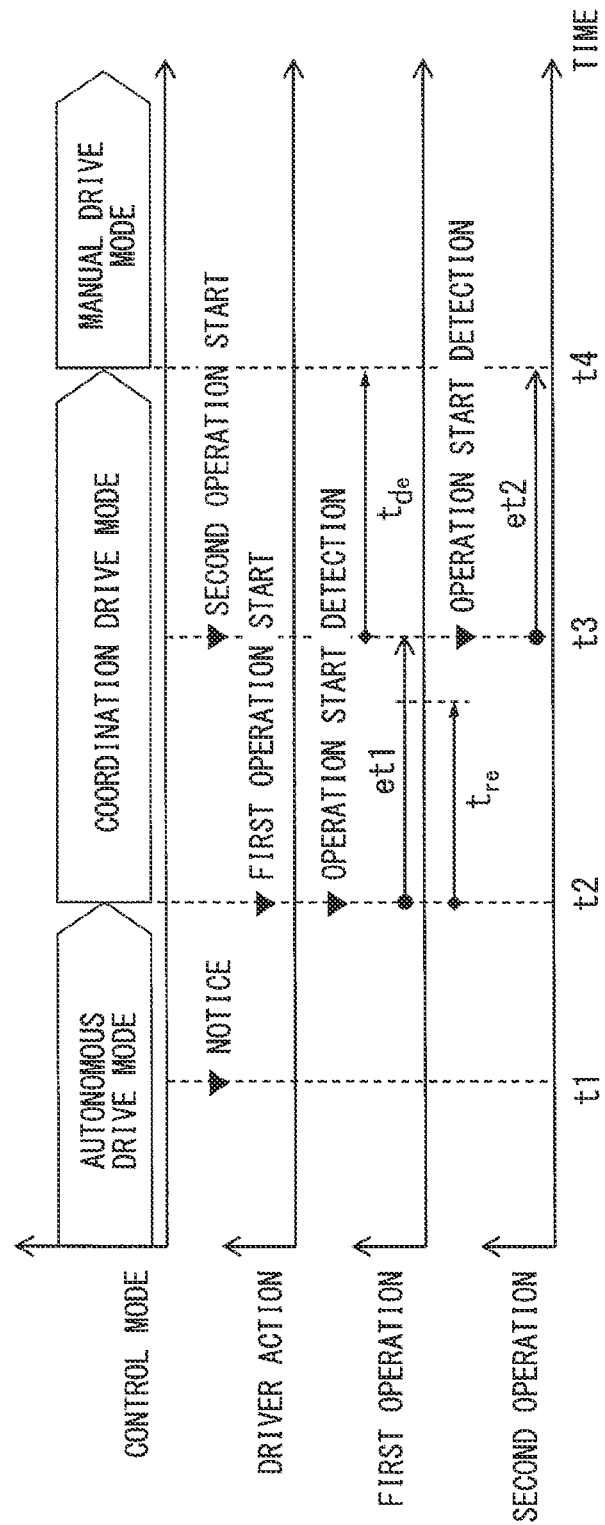
FIG. 8 is a time chart showing a transition when the drive mode switch is executed by the override according to a second embodiment.
Figure 9:
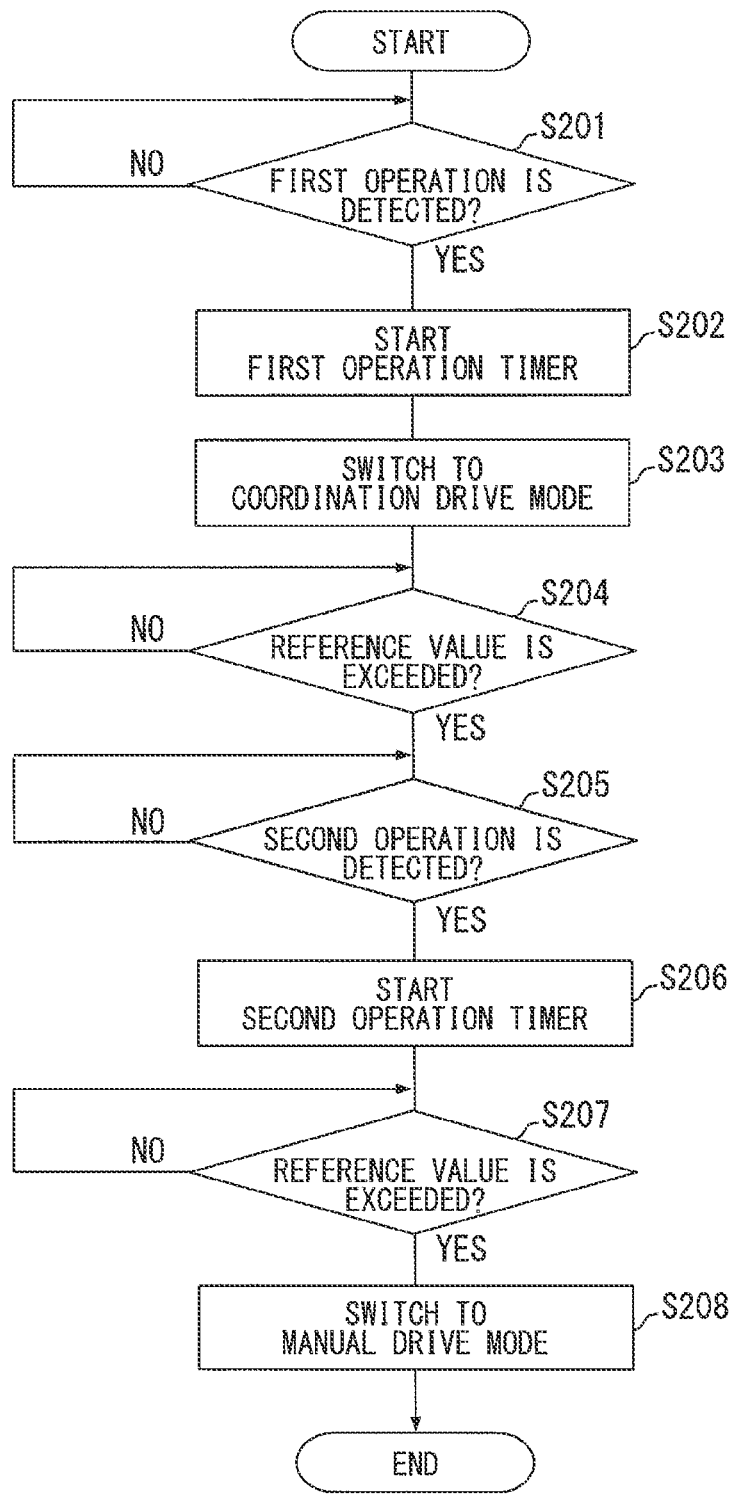
FIG. 9 is a flowchart showing details of a drive mode switch control processing for realizing the drive mode switch by the override of FIG. 8.

The transition of switching of the drive mode at the time of the override and the detail of the drive mode switch control processing will be sequentially described based on FIGS. 8 and 9 with reference to FIG. 1.

In the time chart shown in FIG. 8, the transition by the time point t3 is substantially the same as in the first embodiment (see FIG. 4). When the driver notices at the time point t1 and inputs the drive operation, the drive operation is detected as the first operation at the time point t2. Based on the detection determination of the first operation, the drive state switch block 63a switches the drive mode from the autonomous drive mode to the coordination drive mode.

At the time point t3 after the first operation continues beyond the intention recovery time tre, which is the reference value, from the switching to the coordination drive mode, the drive operation is detected as the second operation in response to the input of the drive operation by the driver. At the time point t4 at which the second operation exceeds the reference value, the drive state switch block 63a switches the drive mode from the coordination drive mode to the manual drive mode. The above-described switch standby time tde (approximately 0.5 seconds) is used as an example of the reference value to be compared with the continuation period of the second operation.

S201 to S205 of the flowchart shown in FIG. 9 are substantially the same as S101 to S105 (see FIG. 6) of the first embodiment. At S203, the switching to the coordination drive mode is executed. At S206 after the detection of the second operation at S205, the drive switch control unit 63 starts counting of the timer, which measures the continuation period of the second operation, in order to measure an elapsed time et2 from the time point t3 (see FIG. 8) at which the second operation is detected, and the processing proceeds to S207.

At S207, the drive switch control unit 63 determines whether the elapsed time et2 of the timer that has started counting at S206 exceeds the reference value, which is provided by the switch standby time tde. At S207, the drive switch control unit 63 repeats the determination whether the elapsed time et2 exceeds the reference value. When the elapsed time et2 exceeds the reference value, the processing proceeds to S208. At S208, the drive switch control unit 63 switches the drive mode of the vehicle A from the coordination drive mode to the manual drive mode (see time point t4 in FIG. 8), and the drive mode switch control processing is terminated.

Figure 10:
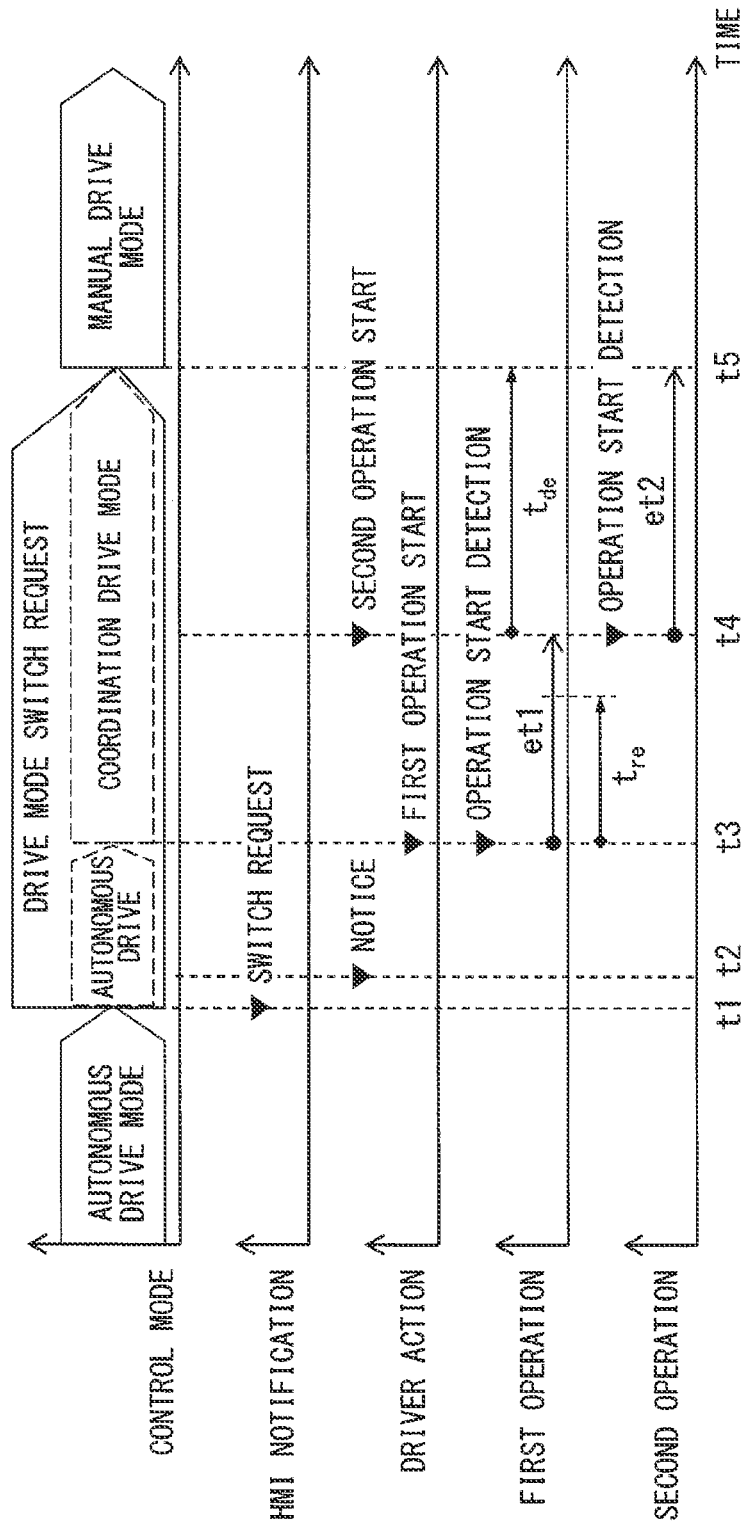
FIG. 10 is a time chart showing a transition when the drive mode switch is executed by the handover according to the second embodiment.
Figure 11:
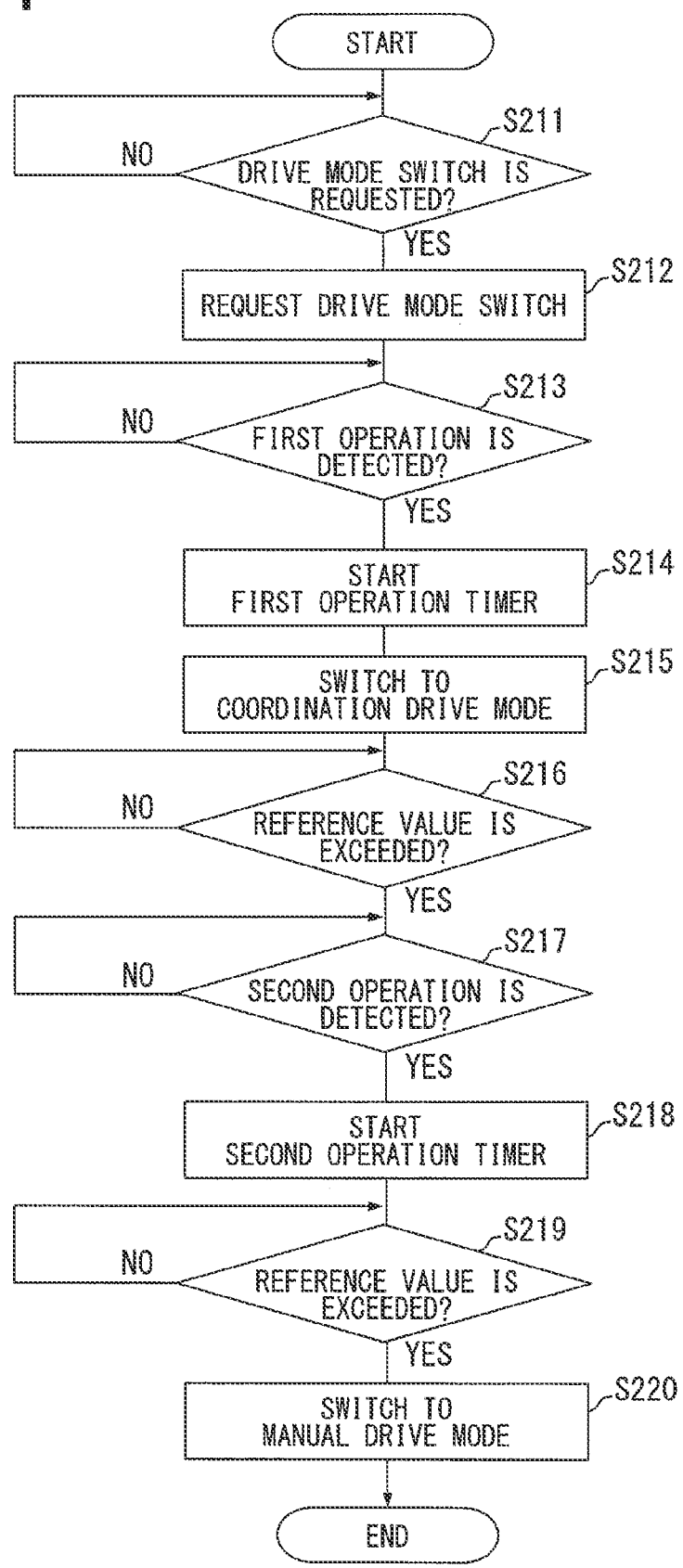
FIG. 11 is a flowchart showing details of a drive mode switch control processing for realizing the drive mode switch by the handover of FIG. 10.

The transition of switching of the drive mode at the time of handover and the detail of the drive mode switch control processing will be sequentially described based on FIGS. 10 and 11 with reference to FIG. 1.

In the time chart shown in FIG. 10, the transition by the time point t3 is substantially the same as in the first embodiment (see FIG. 5). The drive mode switch to the driver may be requested at the time point t1 due to the transition to the mode for performing the drive mode switch request. In this case, after the driver's notice occurs at the time point t2, the driver inputs the drive operation. The drive operation is detected at the time point t3, and the drive state switch block 63a switches to the coordination drive mode.

At the time point t4 after the first operation continues beyond the intention recovery time tre, which is the reference value, from the switching to the coordination drive mode, the drive operation is detected as the second operation in response to the input of the drive operation by the driver. At the time point t5 at which the second operation exceeds the switch standby time tde, which is the reference value, the drive state switch block 63a switches the drive mode from the coordination drive mode to the manual drive mode.

S211 to S217 of the flowchart shown in FIG. 11 are substantially the same as S111 to S117 (see FIG. 7) of the first embodiment. At S215, the switching to the coordination drive mode is executed. At S218 after the detection of the second operation at S217, the drive switch control unit 63 starts counting of a timer in order to measure an elapsed time et2 from the time point t4 (see FIG. 10) at which the second operation is detected, and the processing proceeds to S219.

At S219, the drive switch control unit 63 determines whether the elapsed time et2 of the timer that has started counting at S218 exceeds the reference value, which is provided by the switch standby time tde. At S219, the drive switch control unit 63 repeats the determination whether the elapsed time et2 exceeds the reference value. When the elapsed time et2 exceeds the reference value, the processing proceeds to S220. At S220, the drive mode switch control unit 63 switches the drive mode of the vehicle A from the coordination drive mode to the manual drive mode (see time point t5 at FIG. 10), and the drive mode switch control processing is terminated.

In the second embodiment described above, the same effects as in the first embodiment can be obtained. After the driver becomes in a state that can reflect the intention on the drive operation, the switching to the manual drive mode, that is, the cancel of the autonomous drive function can be executed.

In addition, in the second embodiment, the switching of the drive state from the coordination drive mode to the manual drive mode is started at the time point when the second operation continues beyond the switch standby time tde. In the above-described configuration, the switching to the manual drive mode starts not immediately after the detection of the second operation but at the elapse of the switch standby time tde. Thus, for example, even when the driver touches another operation target without intention as the input of the first operation, the drive mode switch is prevented. Thus, the autonomous drive ECU 50 can reliably pass the control right of the drive operation to the driver in a state in which the intention can be reflected in the drive operation.

Third Embodiment

Figure 12:
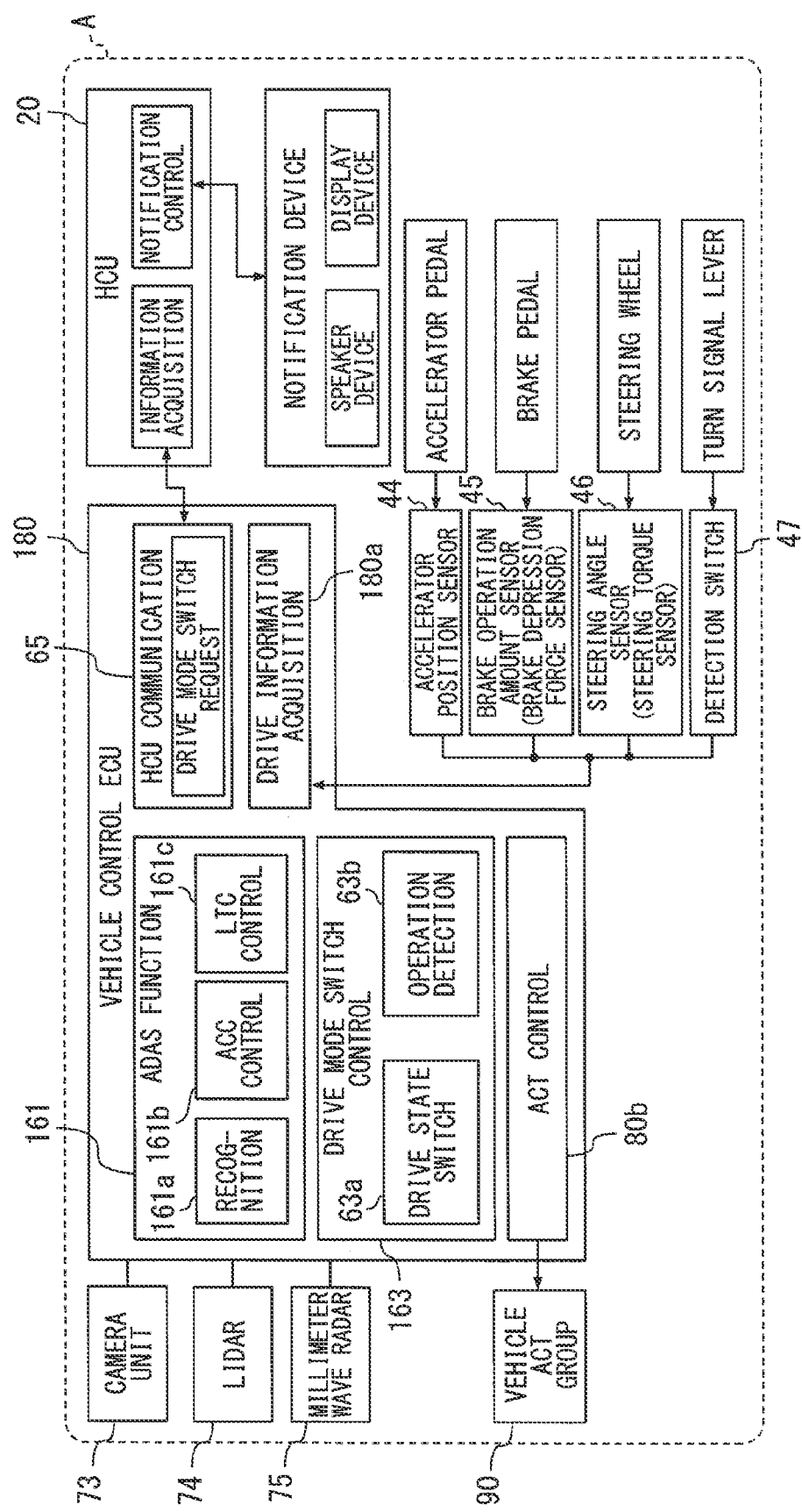
FIG. 12 is a block diagram showing an overview of a configuration related to an autonomous drive according to a third embodiment.
Figure 13:
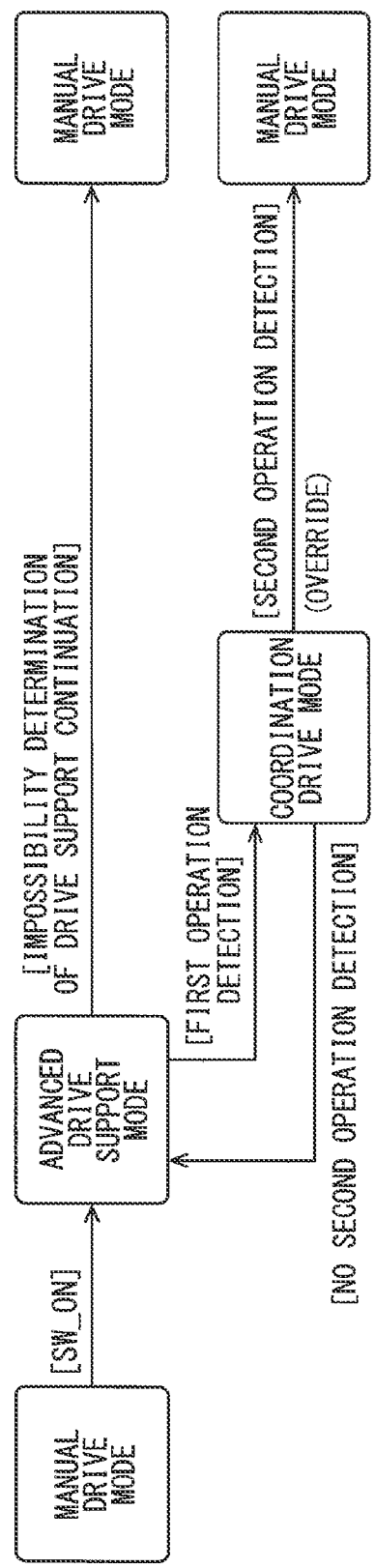
FIG. 13 is a state transition diagram showing an overview of the drive mode transition executed by a drive mode switch control unit of a third embodiment.
Figure 14:
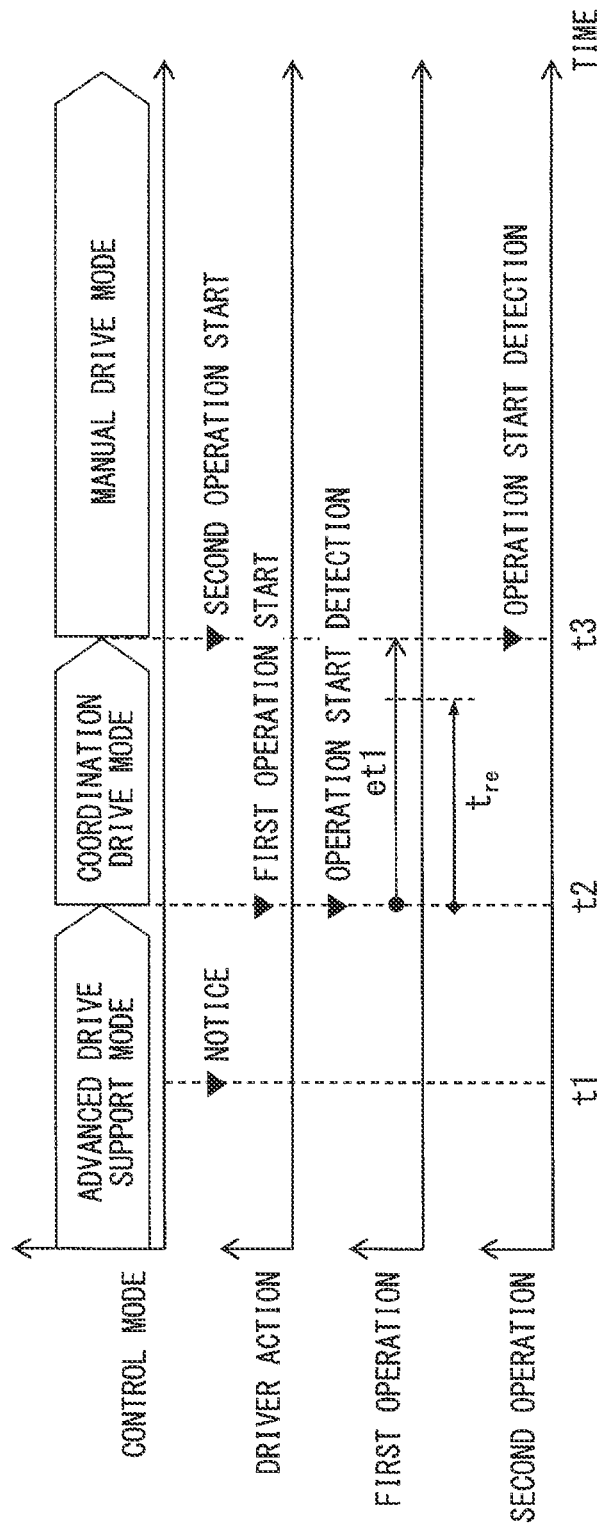
FIG. 14 is a time chart showing a transition when the drive mode switch is executed by the override according to the third embodiment.

A third embodiment of the present disclosure shown in FIGS. 12 to 14 is another modification of the first embodiment. The autonomous drive function mounted on the vehicle A of the third embodiment is a function of semi-autonomous drive realized by a so-called advanced drive support system.

The advanced drive support system referred to the third embodiment is a system on the premise that the driver can drive at any time during the operation of the autonomous drive function by the system. When the advanced drive support system determines that the drive support cannot be continued, the drive state transitions to the manual drive mode without a drive mode switch request as in the above-described embodiment.

The advanced drive support system can execute acceleration, steering, or braking of the vehicle A. In the advanced drive support system, the request for drive mode switch based on the long and medium term travel plan is not executed. The function of the drive mode switch control device in the vehicle A mounted on such an advanced drive support system is realized by a vehicle control ECU 180 shown in FIG. 12.

The vehicle control ECU 180 has a part of the functions of the autonomous drive ECU 50 (see FIG. 1) of the first embodiment, and enables the semi-autonomous drive for the vehicle A. In the vehicle control ECU 180, a drive information acquisition unit 180a, an ADAS function unit 161, and a drive mode switch control unit 163 are constructed as functional blocks, and the actuator control unit 80b and the HCU communication unit 65, each of which is substantially the same as the first embodiment, are also constructed as functional blocks.

The drive information acquisition unit 180a has the function of the operation information acquisition block 64a (see FIG. 1) of the first embodiment. The drive information acquisition unit 180a acquires the operation information output from each of the sensors 44 to 46 and the detection switch 47. The operation information is provided to the drive mode switch control unit 163, and is used at the time of the drive mode switch from the autonomous drive function to the driver.

An ADAS (Advanced drive Assistant System) functional unit 161 has a target recognition block 161a, an ACC (Adaptive Cruise Control) function block 161b, and an LTC (Lane Trace Control) function block 161c as sub functional blocks.

The target recognition block 161a detects the relative position and the like of moving object and stationary object in the travel direction by integrating detected object information acquired from the camera unit 73, the lidar 74, and the millimeter wave radar 75. For example, the target recognition block 161a can recognize a preceding vehicle, a lane marking, or the like.

The ACC function block 161b controls the travel speed of the vehicle A by adjusting the drive force and the braking force in cooperation with the actuator control unit 80b based on the relative position information of the moving object or the stationary object recognized by the target recognition block 161a. Specifically, the ACC function block 161b causes the vehicle A to cruise at a target speed set by the driver when a leading vehicle is not detected. When a leading vehicle is detected, the ACC function block 161b causes the vehicle A to follow the preceding vehicle while maintaining the distance between the preceding vehicle.

The LTC function block 161c controls the steering angle of the steering wheel of the vehicle A by adjusting the steering force in cooperation with the actuator control unit 80b based on the shape information of the lane marking in the travel direction acquired from the target recognition block 161a. The LTC function block 161c causes the vehicle A to travel so as to follow the lane in the travel.

The drive mode switch control unit 163 determines the intention of the driver for the override and stops the operation of the ADAS function unit 161 that realizes the advanced drive support system. The drive mode switch control unit 163 includes the operation detection block 63b and the operation state switch block 63a as in the first embodiment. The operation detection block 63b detects the drive operation of the driver related to the override based on the operation information acquired by the drive information acquisition unit 180a.

The drive state switch block 63a switches the drive mode among the manual drive mode, an advanced drive support mode, and the coordination drive mode. As shown in FIGS. 12 to 14, the drive state switch block 63a switches the drive mode from the manual drive mode to the advanced drive support mode in response to an input to a switch for instructing the operation of ACC or LTC provided in the operation system such as a steering switch (see FIG. 13). In the advanced drive support mode, at least one of the ACC function block 161b and the LTC function block 161c functions.

In the advanced drive support mode, when the driver notices (see time point t1 in FIG. 14), the driver inputs a drive operation (see time point t2 in FIG. 14). Based on the detection of the first operation, the drive state switch block 63a switches the drive mode from the advanced drive support mode to the coordination drive mode.

In the coordination drive mode, when the driver inputs the additional drive operation after the elapsed time et1 exceeds the intention recovery time tre due to the continuation of the first operation, the additional drive operation is detected as the second operation (see time point t3 in FIG. 14). Based on the detection of the second operation, the drive state switch block 63a switches the drive mode from the coordination drive mode to the manual drive mode. As described above, the override by the driver is completed. The override of the third embodiment can be realized by the drive mode switch control processing (see FIG. 7) substantially the same as the override of the first embodiment.

On the other hand, a predetermined restart standby period passes without the detection of the second operation after the switching to the coordination drive, the drive mode switch control unit 163 returns the drive mode from the coordination drive mode to the advanced drive support mode.

When determining that the continuation of the autonomous drive in the advanced drive support mode is impossible, the ADAS function unit 161 automatically stops the ACC function block 161b and the LTC function block 161c. With the above-described configuration, the operation mode is switched to the manual operation mode.

As described in the third embodiment, the same effects as in the first embodiment are obtained in the transfer of the authority of the advanced drive support system, and the configuration can switch to the manual drive mode after the driver becomes in the state that can reflect the intention in the drive operation. In the third embodiment, the vehicle control ECU 180 corresponds to the "drive mode switch control device", the drive information acquisition unit 80a corresponds to the "operation information acquisition unit", and the advanced drive support mode corresponds to the "autonomous drive state".

Fourth Embodiment

Figure 15:
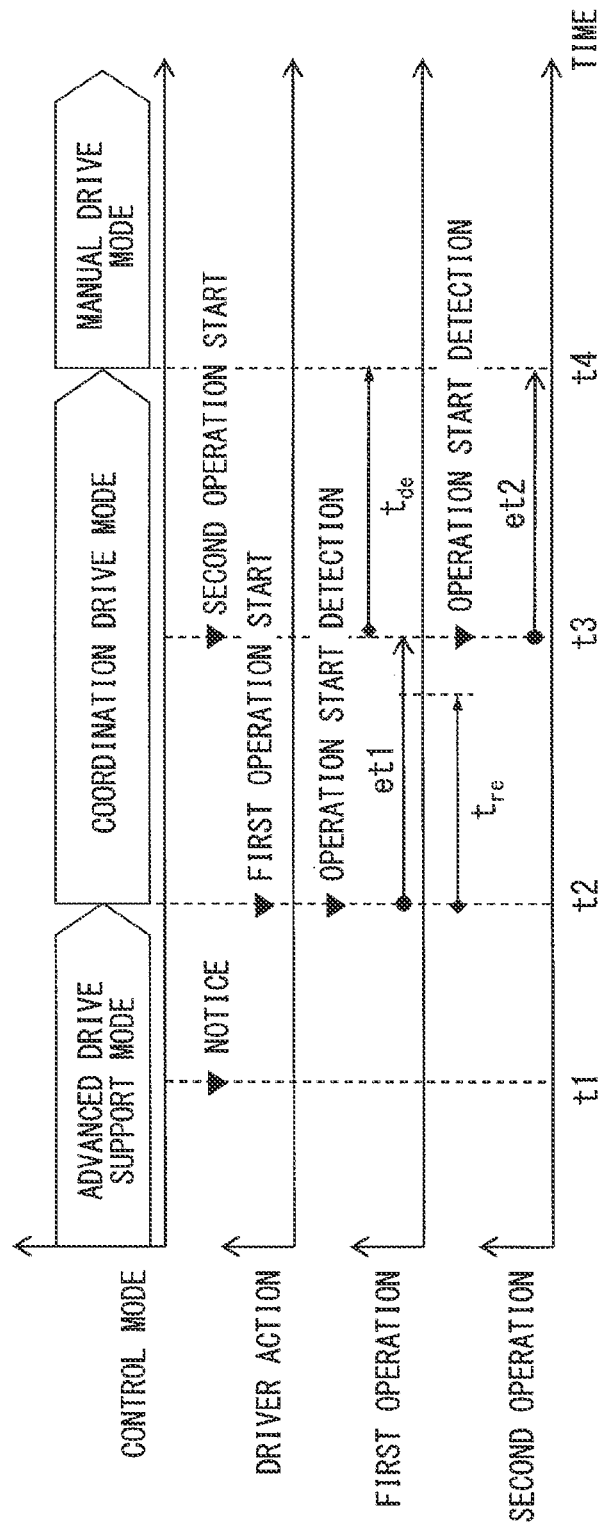
FIG. 15 is a time chart showing a transition when the drive mode switch is executed by the override according to a fourth embodiment.

A fourth embodiment of the present disclosure shown in FIG. 15 is a modification of the third embodiment. When the second operation may continue beyond a predetermined switch standby time tde, the drive state switch block 63a (see FIG. 12) according to the fourth embodiment starts switching from the coordination drive mode to the manual drive mode, similarly to the second embodiment.

The transition in the override according to the fourth embodiment is substantially the same as the transition in the override according to the second embodiment (see FIG. 5). Specifically, when the driver notices at the time point t1 and a drive operation is input, the drive operation is detected as a first operation at the time point t2. Based on the detection determination of the first operation, the drive state switch block 63a switches the drive mode from the advanced drive support mode to the coordination drive mode.

At the time point t3 after the first operation continues beyond the intention recovery time tre (approximately 0.5 seconds) from the switching to the coordination drive mode, the drive operation is detected as the second operation in response to the input of the drive operation by the driver. At the time point t4 at which the second operation continues beyond the switch standby time tde (approximately 0.5 seconds), the drive state switch block 63a switches the drive mode from the coordination drive mode to the manual drive mode. As described above, the override by the driver is completed. The override of the fourth embodiment can be realized by the drive mode switch control processing (see FIG. 9) substantially the same as the second embodiment.

As described in the third embodiment, the same effects as in the third embodiment are obtained, and the configuration can switch to the manual drive mode after the driver becomes in the state that can reflect the intention in the drive operation.

Other Embodiments

In the above-described embodiment, it is desirable that the operation target of the first operation to be the trigger of switching to the coordination drive mode is limited to the accelerator pedal, the brake pedal, and the steering wheel. On the other hand, the operation target of the second operation to be the trigger of switching to the manual operation mode is not limited to the operation target for the first operation, and may include the turn signal lever, the shift lever, the shift paddle, or the like.

The drive operation detected as the second operation may be limited to the drive operation input to an operation target different from the operation target input for the first operation. That is, a drive operation that adjusts the depression force of the accelerator pedal or the brake pedal may not be detected as the second operation. Whether to provide the switch standby time may be set according to the type of the operation target to which the second operation is input.

In the above-described embodiment, the drive operation detected as the second operation is limited to the drive operation after the input of the first operation continues for equal to or more than the intention recovery time (approximately 0.5 seconds). The specific length of the intention recovery time may be adjusted accordingly. In addition, the operation detection block may detect, as the second operation, the drive operation after a predetermined intention recovery time (for example, 2.5 seconds) has elapsed from the start time point of the drive mode switch request (see time point t1 in FIG. 5).

In the first embodiment, the switching to the manual operation mode is immediately started with the detection of the second operation as the trigger. Alternatively, a predetermined delay time may be set between the detection of the second operation and the start of the switching. The length of such delay time may be changed as appropriate according to the travel environment, the travel state, or the like.

In the above-described embodiment, when the second operation is not detected after the transition to the coordination drive mode, the drive mode is returned to the autonomous drive mode or the advanced drive support system mode. Alternatively, the coordination drive mode may be continued until the detection of the second operation.

In the first embodiment, when the drive operation is not detected after the drive mode switch is requested, the drive mode is forcibly switched to the autonomous retraction mode. Alternatively, the switching to the autonomous retraction mode may not be performed. For example, the vehicle A may be gradually stopped without searching for the stop position. Moreover, the notification device which requests drive mode switch is not limited to the display device and the speaker device. The notification device may be constituted by a tactile sense presentation device.

As described in the above embodiment, the control, which employs the second operation for the trigger of switching from the coordination drive mode to the manual drive mode, can be applied to the low-level autonomous drive and high-level autonomous drive. In the low-level autonomous drive, the driver is obliged to monitor the drive even though the autonomous drive is in progress. In the high-level autonomous drive, the drive monitoring duty is not imposed to the driver.

The function of the drive mode switch control device may be realized by a configuration different from the configuration of the above-described autonomous drive ECU 50 and the vehicle control ECU 180. For example, a processing unit provided in the HCU 20 or the like may execute the drive mode switch control method according to the present disclosure. Alternatively, the processing unit, in which the functions of more than two of the autonomous drive ECU, the vehicle control ECU, and the HCU are integrated, may execute the drive mode switch control method according to the present disclosure. Alternatively, a plurality of electronic control units may cooperate to execute the drive mode switch control method according to the present disclosure. As described above, each function related to drive mode switch may be appropriately realized by various electronic control units mounted on the vehicle. Various non-transitory tangible memory medium (non-transitory tangible storage medium) such as a flash memory and a hard disk may store the drive mode switch program or the like which is executed by each processing unit.

The flowcharts or the processing depicted in the flowcharts according to the present disclosure include a plurality of sections (alternatively referred to as steps) each indicated as S101 or the like. Some of the sections may be further divided into a plurality of subsections or may be appropriately combined to configure a single section. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

Although the present disclosure has been described in accordance with the examples, it is understood that the disclosure is not limited to such examples or structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

The invention claimed is:

1. A drive mode switch control device for a vehicle configured to control a drive mode switch between a driver and an autonomous drive function, the vehicle including the autonomous drive function configured to perform a drive operation instead of the driver, the drive mode switch control device comprising:
an operation information acquisition unit configured to acquire operation information related to drive operations input by the driver;
a drive state switch unit configured to switch a drive state among at least an autonomous drive state, a manual drive state, and a coordination drive state;
an operation detection unit configured to detect an input of a first driving operation and an input of a second driving operation based on the operation information, in response to the drive state not being in the manual drive state, wherein
in the autonomous drive state, a travel of the vehicle is controlled by the autonomous drive function,
in the manual drive state, the travel of the vehicle is controlled by the driver,
in the coordination drive state, the travel of the vehicle is controlled by coordinating a control of the autonomous drive function and the drive operations of the driver,
the first driving operation is a driving operation input to a first operation target in the vehicle by the driver,
the second driving operation is a driving operation input to the first operation target by the driver after the first driving operation is input,
the second driving operation in magnitude is smaller than the first driving operation in magnitude,
the drive state switch unit switches the drive state from the autonomous drive state to the coordination drive state in response to detecting the first driving operation, and
the drive state switch unit switches the drive state from the coordination drive state to the manual drive state in response to detecting the second driving operation.

2. The drive mode switch control device according to claim 1, wherein
the drive state switch unit starts switching the drive state from the coordination drive state to the manual drive state when the operation detection unit detects the second driving operation.

3. The drive mode switch control device according to claim 1, wherein
the drive state switch unit starts switching the drive state from the coordination drive state to the manual drive state when the second operation continues to exceed a predetermined switch standby time after the operation detection unit detects the second driving operation.

4. The drive mode switch control device according to claim 1, further comprising
a drive mode switch request unit configured to request, to the driver, the drive mode switch from the autonomous drive function to the driver,
wherein:
the drive state switch unit switches the drive state to an autonomous retraction state when the operation detection unit does not execute the detection determination of the second driving operation in a request execution time for the drive mode switch defined by the drive mode switch request unit; and
in the autonomous retraction state, the vehicle is caused to stop at a stop position searched by the autonomous drive function.

5. The drive mode switch control device according to claim 4, wherein
the drive state switch unit switches the drive state from the coordination drive state to the autonomous drive state when the drive mode switch request unit does not request the drive mode switch and a predetermined restart standby period elapses without the detection determination of the second driving operation after the drive state switch unit switches the drive state to the coordination drive state based on the detection determination of the first driving operation.

6. The drive mode switch control device according to claim 1, wherein
in response to the vehicle being in the coordination drive state and a first drive force input from the autonomous drive function being greater in magnitude than a second drive force input from the driver, the vehicle is controlled in the coordination drive state with the first drive force input, and
in response to the vehicle being in the coordination drive state and the second drive force input from the driver being greater in magnitude than the first drive force input from the autonomous drive function, the driver is allowed to control the vehicle in the coordination drive state with the second drive force input.

7. A drive mode switch control device for a vehicle configured to control a drive mode switch between a driver and an autonomous drive function, the vehicle including the autonomous drive function configured to perform a drive operation instead of the driver,
the drive mode switch control device comprising:
an operation information acquisition unit configured to acquire operation information related to drive operations input by the driver;
a drive state switch unit configured to switch a drive state among at least an autonomous drive state, a manual drive state, and a coordination drive state;
an operation detection unit configured to detect an input of a first driving operation and an input of a second driving operation based on the operation information, in response to the drive state not being in the manual drive state, wherein
in the autonomous drive state, a travel of the vehicle is controlled by the autonomous drive function,
in the manual drive state, the travel of the vehicle is controlled by the driver,
in the coordination drive state, the travel of the vehicle is controlled by coordinating a control of the autonomous drive function and the drive operations of the driver,
the first driving operation is a driving operation input by the driver,
the second driving operation is a driving operation started by the driver after a predetermined intention recovery time elapses from the first driving operation being detected,
the drive state switch unit switches the drive state from the autonomous drive state to the coordination drive state in response to detecting the first driving operation, and
the drive state switch unit switches the drive state from the coordination drive state to the manual drive state in response to detecting the second driving operation.

8. A drive mode switch control method for a vehicle configured to control a drive mode switch between a driver and an autonomous drive function, the vehicle including the autonomous drive function configured to perform a drive operation instead of the driver, the drive mode switch control method being executed by at least one processor,
the drive mode switch control method comprising:
acquiring operation information related to drive operations input by the driver;
switching a drive state among at least an autonomous drive state, a manual drive state, and a coordination drive state;

detecting an input of a first driving operation and an input of a second driving operation based on the operation information, in response to the drive state not being in the manual drive state;

switching from the autonomous drive state to the coordination drive state in response to detecting the first driving operation; and switching from the coordination drive state to the manual drive state in response to detecting the second driving operation, wherein in the autonomous drive state, a travel of the vehicle is controlled by the autonomous drive function, in the manual drive state, the travel of the vehicle is controlled by the driver, in the coordination drive state, the travel of the vehicle is controlled by coordinating a control of the autonomous drive function and the drive operations of the driver, the first driving operation is a driving operation input to a first operation target in the vehicle by the driver, the second driving operation is a driving operation input to the first operation target by the driver after the first driving operation is input, and the second driving operation in magnitude is smaller than the first driving operation in magnitude.

9. A drive mode switch control method for a vehicle configured to control a drive mode switch between a driver and an autonomous drive function, the vehicle including the autonomous drive function configured to perform a drive operation instead of the driver, the drive mode switch control method being executed by at least one processor, the drive mode switch control method comprising:

acquiring operation information related to drive operations input by the driver;

switching a drive state among at least an autonomous drive state, a manual drive state, and a coordination drive state;

detecting an input of a first driving operation and an input of a second driving operation based on the operation information, in response to the drive state not being in the manual drive state;

switching from the autonomous drive state to the coordination drive state in response to detecting the first driving operation; and switching from the coordination drive state to the manual drive state in response to detecting the second driving operation, wherein in the autonomous drive state, a travel of the vehicle is controlled by the autonomous drive function, in the manual drive state, the travel of the vehicle is controlled by the driver, in the coordination drive state, the travel of the vehicle is controlled by coordinating a control of the autonomous drive function and the drive operations of the driver, the first driving operation is a driving operation input by the driver, and the second driving operation is a driving operation started by the driver after a predetermined intention recovery time elapses from the first driving operation being detected.

* * * * *